US012754395B2

(12) United States Patent
Kim et al.

(10) Patent No.: US 12,754,395 B2
(45) Date of Patent: Oct. 6, 2026

(54) OPTICAL IMAGING SYSTEM

(71) Applicant: SAMSUNG ELECTRO-MECHANICS CO., LTD., Suwon-si (KR)

(72) Inventors: Byung Hyun Kim, Suwon-si (KR); Tae Yeon Lim, Suwon-si (KR); Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 679 days.

(21) Appl. No.: 17/862,034

(22) Filed: Jul. 11, 2022

(65) Prior Publication Data

US 2023/0168466 A1 Jun. 1, 2023

(30) Foreign Application Priority Data

Nov. 29, 2021 (KR) ........................ 10-2021-0167234

(51) Int. Cl.
*G02B 9/62* (2006.01)

(52) U.S. Cl.
CPC ...................................... *G02B 9/62* (2013.01)

(58) Field of Classification Search
CPC ........ G02B 9/62; G02B 9/64; G02B 13/0045; G02B 13/0015; G02B 13/16; G02B 13/18; G02B 27/0025; G02B 27/0012; G02B 27/0172; G02B 15/146; H04N 5/2254; H04N 5/222
USPC ......... 359/656–658, 708, 713, 749, 756–762
See application file for complete search history.

(56) References Cited

U.S. PATENT DOCUMENTS

| | | | | |
|---|---|---|---|---|
| 9,341,818 | B2 | 5/2016 | Lee et al. | |
| 10,908,399 | B2 | 2/2021 | Heu et al. | |
| 2004/0051964 | A1* | 3/2004 | Endo | G02B 15/1421 359/692 |
| 2005/0248854 | A1* | 11/2005 | Takeuchi | G02B 15/1425 359/680 |
| 2006/0203355 | A1* | 9/2006 | Tomioka | G02B 15/177 359/680 |
| 2012/0206627 | A1 | 8/2012 | Reshidko et al. | |
| 2012/0268833 | A1 | 10/2012 | Chou | |
| 2013/0016278 | A1* | 1/2013 | Matsusaka | G02B 13/0045 359/713 |

(Continued)

FOREIGN PATENT DOCUMENTS

| | | | |
|---|---|---|---|
| CN | 106873129 | A | 6/2017 |
| CN | 109212729 | A | 1/2019 |

(Continued)

OTHER PUBLICATIONS

CN113534426 Original and Machine Translation (Year: 2021).*

(Continued)

*Primary Examiner* — Travis S Fissel
(74) *Attorney, Agent, or Firm* — NSIP Law

(57) ABSTRACT

An optical imaging system includes a first lens group including two or more lenses, and a second lens group including two or more lenses. The first lens group and the second lens group are sequentially arranged from an object side, and the second lens group is configured to be movable in an optical axis direction. 0.8<TTL/f<1.2. Here, TTL is a distance from an object-side surface of the foremost lens of the first lens group to an imaging plane, and f is a focal length of the optical imaging system.

18 Claims, 19 Drawing Sheets

(56) References Cited

U.S. PATENT DOCUMENTS

| | | | | |
|---|---|---|---|---|
| 2013/0057972 | A1 | 3/2013 | Lee | |
| 2013/0329121 | A1 | 12/2013 | Ono | |
| 2016/0195702 | A1 * | 7/2016 | Lee | G02B 27/0025 359/713 |
| 2016/0363743 | A1 | 12/2016 | Yoo | |
| 2017/0068108 | A1 | 3/2017 | Kim | |
| 2017/0146811 | A1 | 5/2017 | Son | |
| 2018/0172956 | A1 | 6/2018 | Son | |
| 2019/0004286 | A1 * | 1/2019 | Heu | G02B 15/143 |
| 2020/0209595 | A1 | 7/2020 | Huang | |
| 2021/0063702 | A1 | 3/2021 | Kim et al. | |
| 2021/0165189 | A1 | 6/2021 | Wang et al. | |
| 2021/0333519 | A1 | 10/2021 | Lin et al. | |
| 2021/0349289 | A1 | 11/2021 | Huh et al. | |
| 2022/0035126 | A1 * | 2/2022 | Zhao | G02B 9/04 |
| 2022/0350115 | A1 | 11/2022 | Yoo et al. | |

FOREIGN PATENT DOCUMENTS

| | | | | |
|---|---|---|---|---|
| CN | 112444948 | A | 3/2021 | |
| CN | 113311564 | A | 8/2021 | |
| CN | 113484987 | A | 10/2021 | |
| CN | 113534426 | A * | 10/2021 | G02B 15/16 |
| CN | 113625421 | A | 11/2021 | |
| JP | 2006-119319 | A | 5/2006 | |
| KR | 10-2013-0025750 | A | 3/2013 | |
| KR | 10-2016-0115961 | A | 10/2016 | |
| KR | 10-2017-0028794 | A | 3/2017 | |
| KR | 10-2019-0003113 | A | 1/2019 | |
| TW | 201243422 | A1 | 11/2012 | |
| TW | 202024713 | A | 7/2020 | |
| TW | 202120989 | A | 6/2021 | |
| WO | WO 2015/134173 | A1 | 9/2015 | |

OTHER PUBLICATIONS

Taiwanese Office Action issued on Jul. 3, 2024, in counterpart Taiwanese Patent Application No. 113108503 (7 pages in English, 5 pages in Chinese).

Korean Office Action Issued on Apr. 17, 2024, in Counterpart Korean Patent Application No. 10-2021-0167234 (9 Pages in English, 7 Pages in Korean).

Taiwanese Office Action Issued on Feb. 3, 2023, in counterpart Taiwanese Patent Application No. 111125461 (5 Pages in English, 6 Pages in Chinese).

Chinese Office Action issued on Mar. 5, 2025, in corresponding Chinese Patent Application No. 202211189116.5. (4pages in English, 7pages in Chinese).

Indian Office Action Issued on Jul. 21, 2025, in Counterpart Indian Patent Application No. 202214038171 (10 Pages in English, 8 Pages in Hindu).

Taiwanese Office Action issued on Apr. 27, 2026, in counterpart Taiwanese Patent Application No. 114107594 (13 pages in English, 12 pages in Chinese).

* cited by examiner

OPTICAL IMAGING SYSTEM

CROSS-REFERENCE TO RELATED APPLICATIONS

This application claims the benefit under 35 USC 119(a) of Korean Patent Application No. 10-2021-01 67234 filed on Nov. 29, 2021, in the Korean Intellectual Property Office, the entire disclosure of which is incorporated herein by reference for all purposes.

BACKGROUND

1. Field

The present disclosure relates to an optical imaging system configured to enable macrophotography.

2. Description of the Background

A mobile terminal may include a plurality of camera modules. For example, the mobile terminal may include a first camera module mounted on a front surface of a terminal body and a second camera module mounted on a rear surface of the terminal body. The first camera module and the second camera module may have different optical characteristics. For example, the first camera module may include a wide-angle optical imaging system so as to enable video calls to be made and selfie photographs of a user of the mobile terminal to be taken, and the second camera module may include an optical imaging system having a relatively long focal length so as to enable image capturing of a subject positioned at long distance or middle distance. Accordingly, it may be difficult to capture an image of a subject positioned at middle distance and long distance with the first camera module of the mobile terminal, and it may be difficult to capture an image a subject positioned at a short distance or an ultra-short distance with the second camera module.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens group including two or more lenses, and a second lens group including two or more lenses. The first lens group and the second lens group are sequentially arranged from an object side, the second lens group is configured to be movable in an optical axis direction, and $0.8<TTL/f<1.2$ in which TTL is a distance from an object-side surface of the foremost lens of the first lens group to an imaging plane, and f is a focal length of the optical imaging system.

$|fG1/fG2|$ may be greater than 0.7 and less than 1.4, where fG1 is a focal length of the first lens group, and fG2 is a focal length of the second lens group.

The first lens group may include a first lens, a second lens, and a third lens, sequentially arranged from the object side.

The first lens may have positive refractive power, the second lens may have negative refractive power, and the third lens may have positive refractive power.

f3/f may be greater than 0.32 and less than 0.82, where f3 is a focal length of the third lens.

An image-side surface of the third lens may be convex.

The second lens group may include a fourth lens, a fifth lens, and a sixth lens, sequentially arranged from the object side.

Two of the fourth to sixth lenses may have negative refractive power.

TTL/ImgH may be greater than 4.0 and less than 7.0 in which ImgH is a height of the imaging plane.

In another general aspect, an optical imaging system includes a first lens, a second lens, a third lens, a fourth lens, a fifth lens, and a sixth lens that are sequentially arranged from an object side, an image-side surface of the third lens is convex, and wherein $0.8<TTL/f<1.2$, $0.32<f3/f<0.82$, and $-1.0<R1/R4<1.0$, where TTL is a distance from an object-side surface of the first lens to an imaging plane, f is a focal length of the optical imaging system, f3 is a focal length of the third lens, R1 is a radius of curvature of the object-side surface of the first lens, and R4 is a radius of curvature of an image-side surface of the second lens.

The image-side surface of the second lens may be concave.

An image-side surface of the fifth lens may be convex.

An object-side surface of the sixth lens may be concave.

The fourth lens may have positive refractive power.

The fifth lens may have negative refractive power.

BFL/f may be greater than 0.23 and less than 0.46, where BFL is a distance from an image-side surface of the sixth lens to the imaging plane.

In another general aspect, an optical imaging system includes a first lens, a second lens, a third lens, a fourth lens, a fifth lens, and a sixth lens that are sequentially arranged from an object side and divided into a first lens group and a second lens group of two or more lenses each, wherein the second lens group is disposed toward the image side of the first lens group and configured to be movable in an optical axis direction, and wherein the optical imaging system includes no more than six lenses.

The first lens group may include the first through the third lenses, and the second lens group may include the fourth through the sixth lenses.

TTL/f may be greater than 0.8 and less than 1.2 in which TTL is a distance from an object-side surface of the first lens to an imaging plane, and f is a focal length of the optical imaging system.

The first lens group may include the first through the fourth lenses, and the second lens group may include the fifth and sixth lenses.

TTL/f may be greater than 0.8 and less than 1.2, f3/f may be greater than 0.32 and less than 0.82, and R1/R4 may be greater than −1.0 and less than 1.0, where TTL is a distance from an object-side surface of the first lens to an imaging plane, f is a focal length of the optical imaging system, f3 is a focal length of the third lens, R1 is a radius of curvature of the object-side surface of the first lens, and R4 is a radius of curvature of an image-side surface of the second lens.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
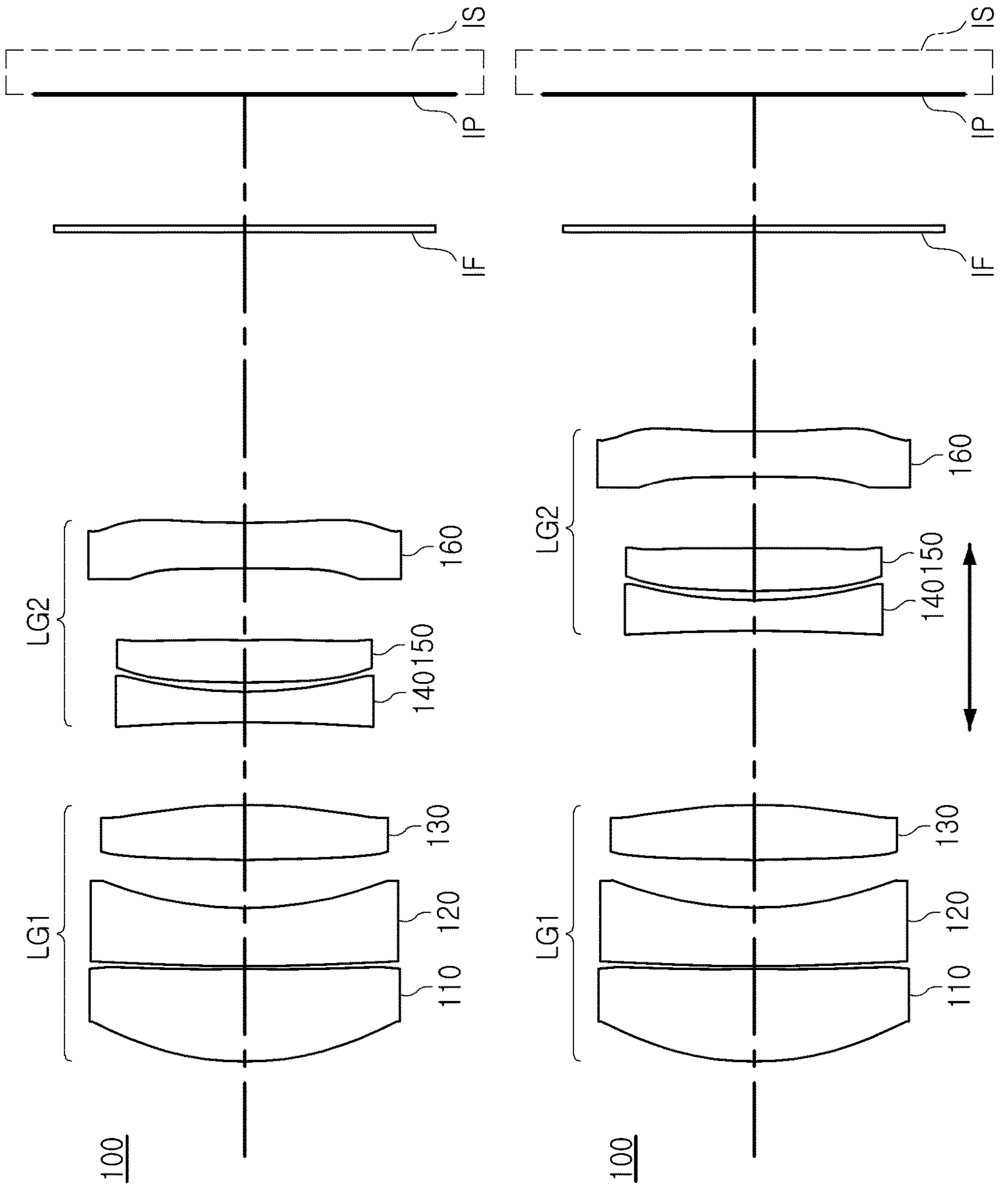
FIG. 1 is a view illustrating an optical imaging system according to a first example embodiment in the present disclosure.

Hereinafter, example embodiments in the present disclosure are described in detail with reference to the accompanying illustrative drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

In describing the present disclosure below, terms referring to components of the present disclosure will be named in consideration of functions of respective components, and thus should not be understood as being limited technical components of the present disclosure.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

An aspect of the present disclosure may provide an optical imaging system capable of enabling close-up photography or macrophotography even with a camera module having telescopic characteristics.

In the drawings, the thickness, size, and shape of a lens are somewhat exaggerated for convenience of explanation. In particular, a shape of a spherical surface or aspherical surface, illustrated in the drawings, is only illustrative. That is, the shape of the spherical surface or aspherical surface is not limited to that illustrated in the drawings.

In the present specification, a first lens refers to a lens closest to an object (or a subject), while a sixth lens refers to a lens closest to an imaging plane (or an image sensor). Further, in the present specification, all of radii of curvature and thicknesses of lenses, a TTL (a distance from an object-side surface of a first lens to the imaging plane), an ImgH (a height of the imaging plane), focal lengths, effective radii, and the like may be indicated in millimeters (mm), and a field of view (FOV) may be indicated in degrees.

Further, thicknesses of the lenses, distances between the lenses, and the TTL are distances measured based on optical axes of the lenses. Further, in a description for shapes of the lenses, the meaning that one surface of a lens is convex is that a paraxial region of a corresponding surface is convex, and the meaning that one surface of a lens is concave is that a paraxial region of a corresponding surface is concave. Therefore, although it is described that one surface of a lens is convex, an edge portion of the lens may be concave. Likewise, although it is described that one surface of a lens is concave, an edge portion of the lens may be convex.

An optical imaging system described herein may be configured to be mounted in a mobile electronic device. For example, the optical imaging system may be mounted in a smartphone, a laptop computer, an augmented reality device, a virtual reality device (VR), a portable game machine, or the like. However, an application range and an application example of the optical imaging system described herein are not limited to the above-described electronic device. For example, the optical imaging system may be applied to a small electronic device or a mobile electronic device that requires high-resolution image capturing, but provides a narrow mounting space.

An optical imaging system according to a first aspect of the present disclosure may include two lens groups. For example, the optical imaging system may include a first lens group including two or more lenses and a second lens group including two or more lenses. The first lens group and the second lens group may be sequentially disposed from an object side. In detail, the second lens group may be disposed on an image side (i.e., a rear side) of the first lens group.

The optical imaging system according to the first aspect may be configured so that the second lens group is movable in an optical axis direction. For example, the second lens group may be configured to be moved in a direction in which it becomes distant from the first lens group (i.e., an imaging plane direction), if necessary.

The optical imaging system according to the first aspect may enable macrophotography by changing a position of the second lens group. As an example, the optical imaging system according to the first aspect may capture an image of a subject positioned at a long distance or a middle distance in a state in which the second lens group is disposed closest to the first lens group, and may capture an image of a subject of an ultra-close position in a state in which the second lens group is disposed furthest from the first lens group. In detail, the optical imaging system according to the first aspect may enable the macrophotography by moving the second lens group by a substantially insignificant distance (within 20% of the TTL).

The optical imaging system according to the first aspect may include six lenses. For example, in the optical imaging system according to the first aspect, the sum of the number of lenses constituting the first lens group and the number of lenses constituting the second lens group may be six. In detail, the first lens group may include a first lens, a second lens, and a third lens sequentially arranged from the object side, and the second lens group may include a fourth lens, a fifth lens, and a sixth lens sequentially arranged from the object side. However, each of the number of lenses constituting the first lens group and the number of lenses constituting the second lens group is not limited to three. For example, the first lens group may include a first lens, a second lens, a third lens, and a fourth lens sequentially arranged from the object side, and the second lens group may include a fifth lens and a sixth lens sequentially arranged from the object side.

In the optical imaging system according to the first aspect, the first lens group may include one or more lenses having positive refractive power and one or more lenses having negative refractive power. For example, the first lens, the second lens, and the third lens constituting the first lens group may sequentially have positive refractive power, negative refractive power, and positive refractive power.

In the optical imaging system according to the first aspect, the second lens group may include two or more lenses having negative refractive power. For example, two or more of the fourth lens, the fifth lens, and the sixth lens constituting the second lens group may have negative refractive power.

The optical imaging system according to the first aspect may satisfy a predetermined conditional expression. For example, the optical imaging system according to the first aspect may satisfy the following conditional expression in relation to the distance (TTL) from the object-side surface of the first lens to the imaging plane and a focal length (f) of the optical imaging system.

$$0.8<TTL/f<1.2$$

The optical imaging system according to the first aspect may further include characteristics other than the characteristics described above. For example, the optical imaging system according to the first aspect may satisfy one or more of the following conditional expressions.

$$0.7<|fG1/fG2|<1.4$$

$$0.7\text{ mm}<Dm<3.0\text{ mm}$$

$$0.06<Dm/TTL<0.20$$

$$0.15<Dm/BFL<0.60$$

$$0.06<Dm/f<0.20$$

$$0.50<fM/f<0.98$$

Here, fG1 is a focal length of the first lens group, fG2 is a focal length of the second lens group, Dm is a maximum variable distance of the second lens group, BFL is a distance from an image-side surface of the rearmost lens of the second lens group to the imaging plane, and fM is a focal length of the optical imaging system in a maximum variable state of the second lens group.

An optical imaging system according to a second aspect of the present disclosure may include a plurality of lenses. For example, the optical imaging system according to the second aspect may include a first lens, a second lens, a third lens, a fourth lens, a fifth lens, and a sixth lens that are sequentially arranged from an object side.

The optical imaging system according to the second aspect may include a lens having a specific shape. For example, the optical imaging system according to the second aspect may include a third lens of which an image-side surface is convex.

The optical imaging system according to the second aspect may satisfy a specific conditional expression. For example, the optical imaging system according to the second aspect may satisfy all of the following conditional expressions.

$$0.8<TTL/f<1.2$$

$$0.32<f3/f<0.82$$

$$-1.0<R1/R4<1.0$$

Here, f3 is a focal length of the third lens, R1 is a radius of curvature of an object-side surface of the first lens, and R4 is a radius of curvature of an image-side surface of the second lens.

An optical imaging system according to a third aspect of the present disclosure may be configured to satisfy one or more of the following conditional expressions. As an example, the optical imaging system according to the third aspect may include six lenses, for example, a first lens, a second lens, a third lens, a fourth lens, a fifth lens, and a sixth lens that are sequentially arranged from an object side, and may satisfy two or more of the following conditional expressions. As another example, the optical imaging system according to the third aspect may include six lenses, for example, a first lens, a second lens, a third lens, a fourth lens, a fifth lens, and a sixth lens that are sequentially arranged from an object side, and may be configured to satisfy all of the following conditional expressions.

$$4.0<TTL/\text{Img}H<7.0$$

$$0.23<BFL/f<0.46$$

$$0.50<f1/f<1.20$$

$$-5.0<f2/f<2.0$$

$$-2.0<f3/f<1.0$$

$$0.4<f5/f<2.0$$

$$-1.2<f6/f<-0.20$$

$$-4.0<(R1+R2)/(R1-R2)<-0.60$$

$$-8.0<(R1+R4)/(R1-R4)<-0.10$$

Here, ImgH is a height of the imaging plane, f1 is a focal length of the first lens, f2 is a focal length of the second lens, f4 is a focal length of the fourth lens, f5 is a focal length of the fifth lens, f6 is a focal length of the sixth lens, and R2 is a radius of curvature of an image-side surface of the first lens.

An optical imaging system according to the present disclosure may include one or more lenses having the following characteristics. As an example, the optical imaging system according to the first aspect may include one of first to sixth lenses according to the following characteristics. As another example, the optical imaging systems according to the second aspect and the third aspect may include one or more of first to sixth lenses according to the following characteristics. However, the optical imaging systems according to the above-described aspects do not necessarily include lenses according to the following characteristics. Characteristics of first to sixth lenses will hereinafter be described.

The first lens may have refractive power. For example, the first lens may have positive refractive power. One surface of the first lens may be convex. For example, an object-side surface of the first lens may be convex. The first lens may have a spherical surface or an aspherical surface. As an example, both surfaces of the first lens may be aspherical. The first lens may be formed of a material having high light transmissivity and excellent workability. For example, the first lens may be formed of plastic or glass. The first lens may have a predetermined refractive index. As an example, the refractive index of the first lens may be less than 1.6. As a specific example, the refractive index of the first lens may be greater than 1.50 and smaller than 1.60. The first lens may have a predetermined Abbe number. As an example, the Abbe number of the first lens may be 50 or more. As a specific example, the Abbe number of the first lens may be greater than 50 and smaller than 60.

The second lens may have refractive power. For example, the second lens may have positive or negative refractive power. One surface of the second lens may be concave. As an example, an object-side surface of the second lens may be concave. As an example, an image-side surface of the second lens may be concave. The second lens may have a spherical surface or an aspherical surface. As an example, both surfaces of the second lens may be aspherical. The second lens may be formed of a material having high light transmissivity and excellent workability. For example, the second lens may be formed of plastic or glass. The second lens may have a predetermined refractive index. As an example, the refractive index of the second lens may be 1.5 or more. As a specific example, the refractive index of the second lens may be greater than 1.50 and smaller than 1.70. The second lens may have a predetermined Abbe number. As an example, the Abbe number of the second lens may be 20 or more. As a specific example, the Abbe number of the second lens may be greater than 20 and smaller than 60.

The third lens may have refractive power. For example, the third lens may have positive refractive power. One surface of the third lens may be convex. For example, an image-side surface of the third lens may be convex. The third lens may have a spherical surface or an aspherical surface. As an example, both surfaces of the third lens may be aspherical. The third lens may be formed of a material having high light transmissivity and excellent workability. For example, the third lens may be formed of plastic or glass. The third lens may have a predetermined refractive index. As an example, the refractive index of the third lens may be 1.5 or more. As a specific example, the refractive index of the third lens may be greater than 1.50 and smaller than 1.60. The third lens may have a predetermined Abbe number. As an example, the Abbe number of the third lens may be 50 or more. As a specific example, the Abbe number of the third lens may be greater than 50 and smaller than 60.

The fourth lens may have refractive power. For example, the fourth lens may have positive or negative refractive power. The fourth lens may have a spherical surface or an aspherical surface. As an example, both surfaces of the fourth lens may be aspherical. As another example, both surfaces of the fourth lens may be spherical. The fourth lens may be formed of a material having high light transmissivity and excellent workability. For example, the fourth lens may be formed of plastic or glass. The fourth lens may have a predetermined refractive index. As an example, the refractive index of the fourth lens may be 1.5 or more. As a specific example, the refractive index of the fourth lens may be greater than 1.50 and smaller than 1.90. The fourth lens may have a predetermined Abbe number. As an example, the Abbe number of the fourth lens may be 15 or more. As a specific example, the Abbe number of the fourth lens may be greater than 15 and smaller than 40.

The fifth lens may have refractive power. For example, the fifth lens may have positive or negative refractive power. One surface of the fifth lens may be convex. For example, an image-side surface of the fifth lens may be convex. However, the image-side surface of the fifth lens is not necessarily limited to being convex. The fifth lens may have a spherical surface or an aspherical surface. As an example, both surfaces of the fifth lens may be aspherical. The fifth lens may be formed of a material having high light transmissivity and excellent workability. For example, the fifth lens may be formed of plastic or glass. The fifth lens may have a predetermined refractive index. As an example, the refractive index of the fifth lens may be 1.5 or more. As a specific example, the refractive index of the fifth lens may be greater than 1.50 and smaller than 1.70. The fifth lens may have a predetermined Abbe number. As an example, the Abbe number of the fifth lens may be 15 or more. As a specific example, the Abbe number of the fifth lens may be greater than 15 and smaller than 40.

The sixth lens may have refractive power. For example, the sixth lens may have positive refractive power. One surface of the sixth lens may be concave. As an example, an object-side surface of the sixth lens may be concave. As an example, an image-side surface of the sixth lens may be concave. The sixth lens may have a spherical surface or an aspherical surface. As an example, both surfaces of the sixth lens may be aspherical. The sixth lens may be formed of a material having high light transmissivity and excellent workability. For example, the sixth lens may be formed of plastic or glass. The sixth lens may have a predetermined refractive index. As an example, the refractive index of the sixth lens may be 1.5 or more. As a specific example, the refractive index of the sixth lens may be greater than 1.50 and smaller than 1.70. The sixth lens may have a predetermined Abbe number. As an example, the Abbe number of the sixth lens may be 20 or more. As a specific example, the Abbe number of the sixth lens may be greater than 20 and smaller than 60.

The first to sixth lenses may have the spherical surfaces or the aspherical surfaces, as described above. When the first to sixth lenses have the aspherical surfaces, these aspherical surfaces may be represented by the following Equation 1:

Equation 1

$$Z = \frac{cr^2}{1 + \sqrt{1 - (1+k)c^2r^2}} + Ar^4 + Br^6 + Cr^8 + Dr^{10} + Er^{12} + Fr^{14} + Gr^{16} + Hr^{18} + Jr^{20} \ldots$$

Here, c is an inverse of a radius of curvature of the lens, k is a conic constant, r is a distance from a certain point on an aspherical surface of the lens to an optical axis, A to H and J are aspherical constants, and Z (or SAG) is a distance between the certain point on the aspherical surface of the lens at the distance r and a tangential plane meeting the apex of the aspherical surface of the lens.

The optical imaging system according to the above-described example embodiment or the above-described aspect may further include a filter. For example, the optical imaging system may include a filter disposed between the sixth lens and the imaging plane. The filter may be configured to block light of a specific wavelength. For example, the filter may be configured to block infrared rays.

Next, optical imaging systems according to example embodiments will be described with reference to the drawings.

First, an optical imaging system according to a first example embodiment will be described with reference to FIG. 1.

The optical imaging system 100 according to the first example embodiment may include a first lens group LG1 and a second lens group LG2. The first lens group LG1 may include a first lens 110, a second lens 120, and a third lens 130, and the second lens group LG2 may include a fourth lens 140, a fifth lens 150, and a sixth lens 160. The first lens group LG1 may be configured such that a position thereof with respect to an imaging plane IP is not changed, but the second lens group LG2 may be configured such that a position thereof with respect to the imaging plane IP may be changed. For example, the second lens group LG2 may be moved toward the imaging plane IP side in a state in which it is disposed close to the first lens group LG1, which may enable close-up photography or macrophotography by the optical imaging system 100.

The first lens 110 may have positive refractive power, and an object-side surface thereof may be convex and an image-side surface thereof may be concave. The second lens 120 may have negative refractive power, and an object-side surface thereof may be convex and an image-side surface thereof may be concave. The third lens 130 may have positive refractive power, and an object-side surface thereof may be convex and an image-side surface thereof may be convex. The fourth lens 140 may have negative refractive power, and an object-side surface thereof may be concave and an image-side surface thereof may be concave. The fifth lens 150 may have positive refractive power, and an object-side surface thereof may be convex and an image-side surface thereof may be convex. The sixth lens 160 may have negative refractive power, and an object-side surface thereof may be convex and an image-side surface thereof may be concave. An inflection point may be formed on the image-side surface of the sixth lens 160.

The optical imaging system 100 may further include a filter IF and the imaging plane IP. The filter IF may be disposed between the sixth lens 160 and the imaging plane IP. The imaging plane IP may be formed at a position where light incident by the first lens 110 to the sixth lens 160 forms an image. For example, the imaging plane IP may be formed on one surface of an image sensor IS of a camera module or inside the image sensor IS.

Figure 2:
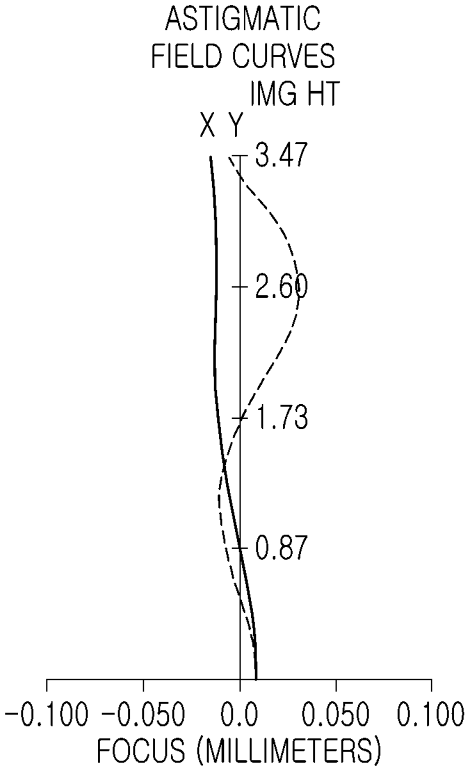
FIG. 2 presents graphs having curves representing aberration characteristics of the optical imaging system illustrated in FIG. 1.
Figure 2:
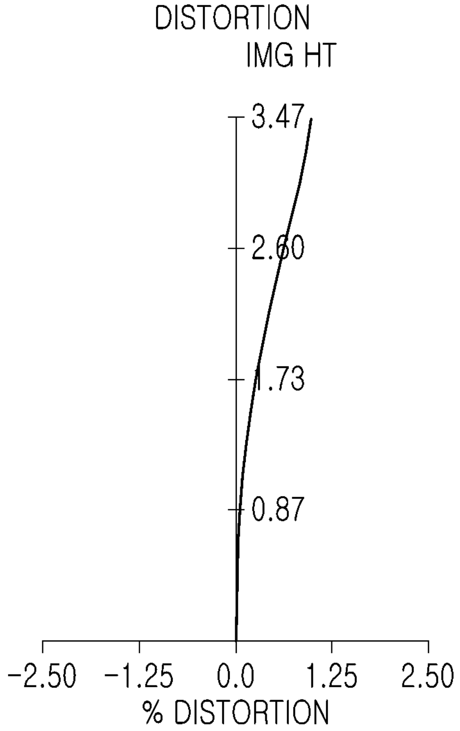

Graphs having curves representing aberration characteristics of the optical imaging system according to the present example embodiment are shown in FIG. 2. Tables 1 and 2 represent characteristics of lenses and aspherical values of the optical imaging system according to the present example embodiment.

TABLE 1

| Surface No. | Component | Radius of Curvature | Thickness/ Distance | Refractive Index | Abbe Number | Effective Radius |
|---|---|---|---|---|---|---|
| S1 | First Lens | 4.6097 | 1.5696 | 1.535 | 55.7 | 2.5 |
| S2 | | 78.2262 | 0.0500 | | | 2.5 |
| S3 | Second Lens | 43.7180 | 1.0000 | 1.639 | 23.5 | 2.4 |
| S4 | | 6.2475 | 0.7867 | | | 2.3 |
| S5 | Third Lens | 30.8505 | 0.9188 | 1.535 | 55.7 | 2.3 |
| S6 | | −8.8963 | 1.4000 | | | 2.2 |
| S7 | Fourth Lens | −18.4105 | 0.5000 | 1.567 | 37.4 | 2.0 |
| S8 | | 7.0082 | 0.1529 | | | 2.0 |
| S9 | Fifth Lens | 10.8843 | 0.7232 | 1.661 | 20.4 | 2.0 |
| S10 | | −37.9948 | 1.2165 | | | 2.0 |
| S11 | Sixth Lens | 71.0270 | 0.7479 | 1.567 | 37.4 | 1.9 |
| S12 | | 9.2813 | 4.8975 | | | 2.1 |
| S13 | Filter | Infinity | 0.1100 | 1.517 | 64.2 | 3.0 |
| S14 | | Infinity | 2.2315 | | | 3.0 |
| S15 | Imaging Plane | Infinity | −0.0087 | | | 3.5 |

TABLE 2

| Surface No. | S2 | S3 | S4 | S5 | S6 | S7 |
|---|---|---|---|---|---|---|
| K | −1.94624E−01 | 9.90000E+01 | 4.79344E+01 | 1.65884E+00 | −2.97269E+00 | −1.16241E+00 |
| A | −4.86992E−04 | 3.88992E−04 | 4.11332E−04 | −9.60518E−04 | −8.30000E−05 | 7.99976E−04 |
| B | −6.50000E−05 | −1.20000E−05 | 4.00000E−06 | −1.71356E−04 | 1.40000E−05 | 1.66492E−04 |
| C | −2.00000E−06 | −7.00000E−06 | 1.48870E−07 | −2.50000E−05 | 1.30000E−05 | 2.40000E−05 |
| D | −1.00000E−06 | −1.00000E−06 | −4.94797E−07 | −1.00000E−06 | 2.00000E−06 | 3.00000E−06 |
| E | −6.96173E−08 | −1.21919E−07 | −1.67608E−08 | 3.17371E−07 | 2.51725E−07 | 1.00000E−06 |
| F | −4.38247E−09 | −1.30616E−08 | 1.25185E−09 | 6.03278E−08 | 3.71263E−08 | −4.27172E−08 |
| G | 2.39849E−10 | −1.25169E−09 | 7.55448E−10 | 5.57995E−09 | 6.52742E−09 | −9.91688E−10 |
| H | 4.98942E−11 | −5.48289E−11 | 8.98790E−11 | 6.45044E−10 | 8.51637E−10 | −1.56035E−09 |
| J | −2.23919E−11 | 1.94400E−11 | −3.08382E−11 | −1.75286E−10 | −1.02084E−10 | 4.21891E−10 |

| Surface No. | S8 | S9 | S10 | S11 | S12 |
|---|---|---|---|---|---|
| K | −9.90000E+01 | 1.04006E+00 | −4.84560E+00 | −8.34478E+01 | −9.90000E+01 |
| A | 2.32707E−03 | 4.03824E−04 | 9.51030E−04 | 1.37197E−03 | −1.88034E−02 |
| B | 4.70000E−05 | 1.00000E−05 | 9.70000E−05 | 3.47831E−04 | 4.27777E−04 |
| C | 1.70000E−05 | −4.00000E−05 | 5.10000E−05 | −4.80000E−05 | 6.87337E−04 |
| D | −1.00000E−05 | −6.00000E−06 | −3.60000E−05 | −1.50000E−05 | −2.84193E−04 |
| E | −6.00000E−06 | −3.00000E−06 | 7.00000E−06 | 2.00000E−06 | −2.00000E−05 |
| F | 1.00000E−06 | 1.00000E−06 | 2.00000E−06 | 1.00000E−06 | 2.10000E−05 |
| G | 2.12660E−07 | 1.03889E−08 | −4.50464E−08 | 2.39627E−07 | −1.00000E−06 |
| H | −4.21457E−08 | −1.36218E−08 | −2.09177E−08 | 2.43700E−08 | −4.65338E−07 |
| J | 7.30743E−10 | −6.12843E−09 | −8.46269E−09 | −8.38303E−09 | 5.63940E−08 |

Figure 3:
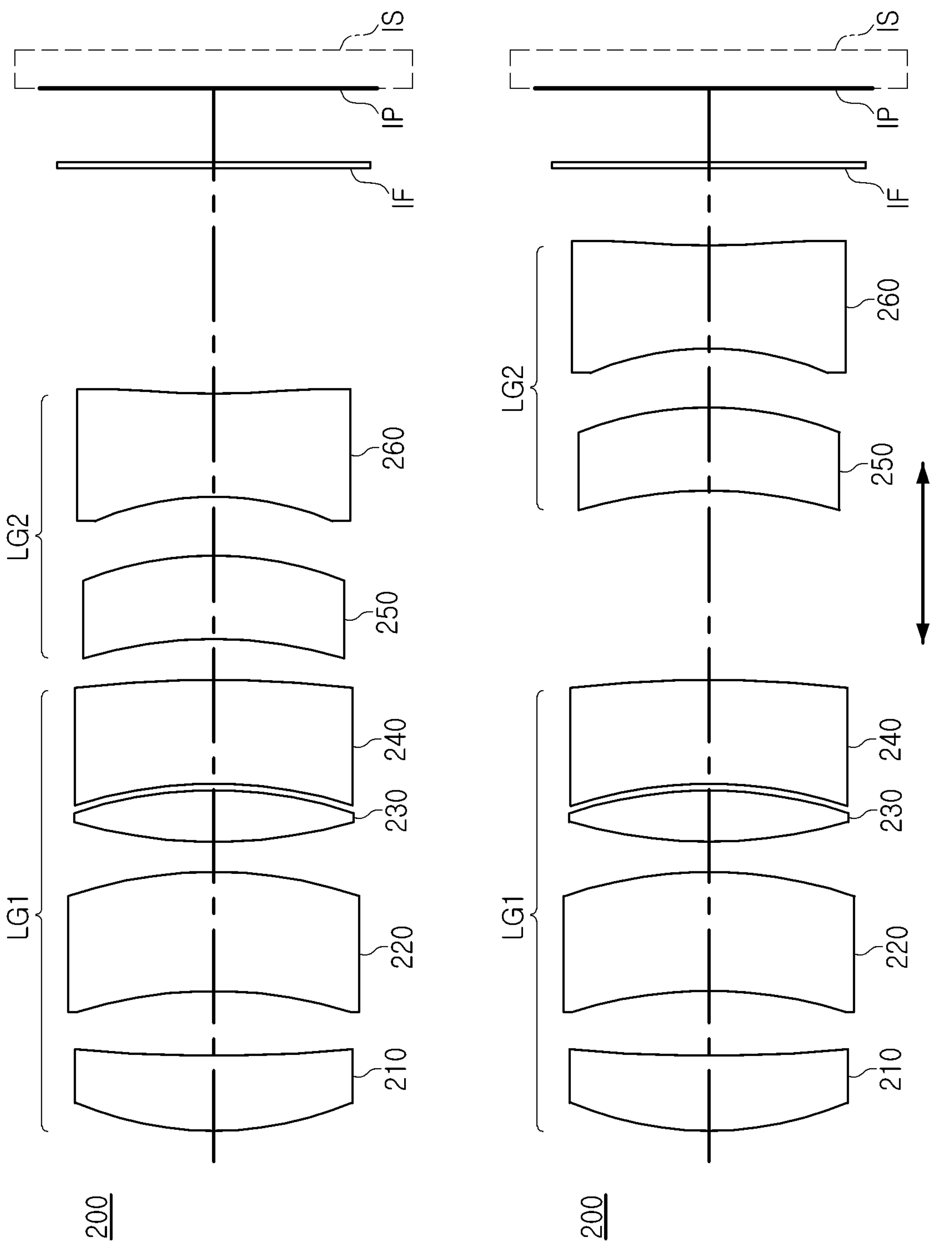
FIG. 3 is a view illustrating an optical imaging system according to a second example embodiment in the present disclosure.

An optical imaging system according to a second example embodiment will be described with reference to FIG. 3.

The optical imaging system 200 according to the second example embodiment may include a first lens group LG1 and a second lens group LG2. The first lens group LG1 may include a first lens 210, a second lens 220, a third lens 230, and a fourth lens 240, and the second lens group LG2 may include a fifth lens 250 and a sixth lens 260. The first lens group LG1 may be configured such that a position thereof with respect to an imaging plane IP is not changed, but the second lens group LG2 may be configured such that a position thereof with respect to the imaging plane IP may be changed. For example, the second lens group LG2 may be moved toward the imaging plane IP side in a state in which it is disposed close to the first lens group LG1, which may enable close-up photography or macrophotography by the optical imaging system 200.

The first lens 210 may have positive refractive power, and an object-side surface thereof may be convex and an image-side surface thereof may be concave. The second lens 220 may have negative refractive power, and an object-side surface thereof may be concave and an image-side surface thereof may be convex. The third lens 230 may have positive refractive power, and an object-side surface thereof may be convex and an image-side surface thereof may be convex. The fourth lens 240 may have negative refractive power, and an object-side surface thereof may be concave and an image-side surface thereof may be convex. The fifth lens 250 may have positive refractive power, and an object-side surface thereof may be concave and an image-side surface thereof may be convex. The sixth lens 260 may have negative refractive power, and an object-side surface thereof may be concave and an image-side surface thereof may be concave.

The optical imaging system 200 may further include a filter IF and the imaging plane IP. The filter IF may be disposed between the sixth lens 260 and the imaging plane IP. The imaging plane IP may be formed at a position where light incident by the first lens 210 to the sixth lens 260 forms an image. For example, the imaging plane IP may be formed on one surface of an image sensor IS of a camera module or inside the image sensor IS.

Figure 4:
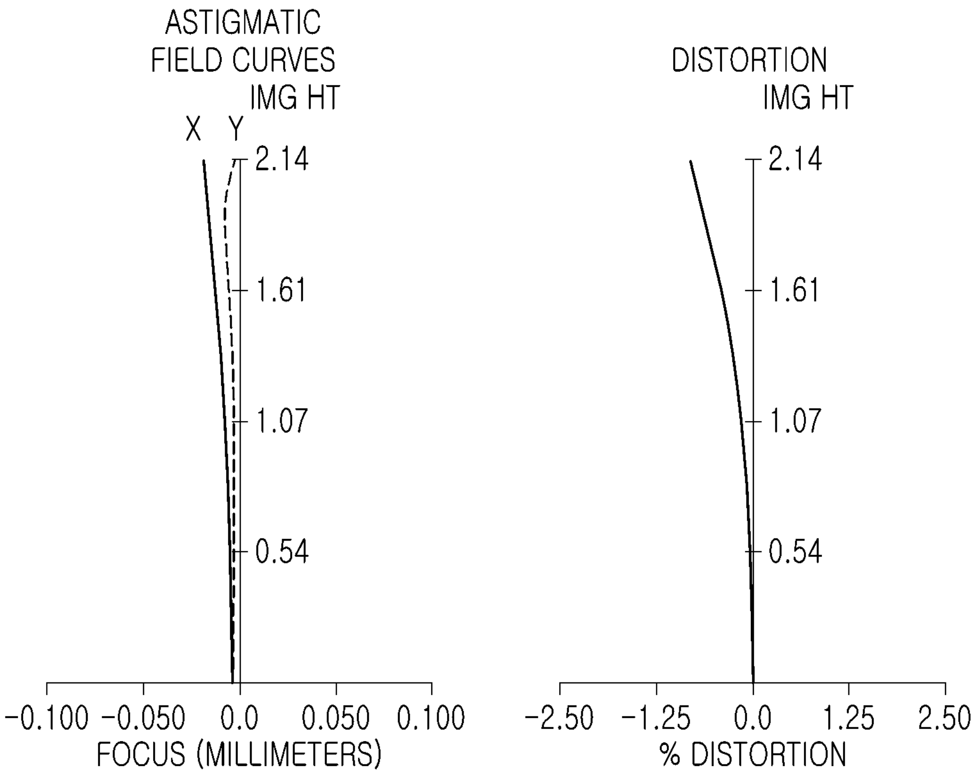
FIG. 4 presents graphs having curves representing aberration characteristics of the optical imaging system illustrated in FIG. 3.

Graphs having curves representing aberration characteristics of the optical imaging system according to the present example embodiment are shown in FIG. 4. Tables 3 and 4 represent characteristics of lenses and aspherical values of the optical imaging system according to the present example embodiment.

TABLE 3

| Surface No. | Component | Radius of Curvature | Thickness/ Distance | Refractive Index | Abbe Number | Effective Radius |
|---|---|---|---|---|---|---|
| S1 | First Lens | 4.2374 | 0.9686 | 1.535 | 55.7 | 1.8 |
| S2 | | 12.9695 | 0.8275 | | | 1.7 |
| S3 | Second Lens | −5.5467 | 1.5000 | 1.535 | 55.7 | 1.7 |
| S4 | | −6.2484 | 0.4032 | | | 1.8 |
| S5 | Third Lens | 6.0019 | 0.6623 | 1.535 | 55.7 | 1.8 |
| S6 | | −5.0664 | 0.1000 | | | 1.7 |
| S7 | Fourth Lens | −5.0564 | 1.3198 | 1.847 | 23.8 | 1.7 |
| S8 | | −16.1505 | 0.5186 | | | 1.7 |
| S9 | Fifth Lens | −4.3212 | 1.0653 | 1.661 | 20.4 | 1.6 |
| S10 | | −3.7149 | 0.7537 | | | 1.6 |
| S11 | Sixth Lens | −5.7610 | 1.3189 | 1.535 | 55.7 | 1.5 |
| S12 | | 6.6345 | 1.9842 | | | 1.6 |
| S13 | Filter | Infinity | 0.1100 | 1.517 | 64.2 | 1.9 |
| S14 | | Infinity | 1.7944 | | | 1.9 |
| S15 | Imaging Plane | Infinity | 0.0037 | | | 2.1 |

it is disposed close to the first lens group LG1, which may enable close-up photography or macrophotography by the optical imaging system 300.

The first lens 310 may have positive refractive power, and an object-side surface thereof may be convex and an image-side surface thereof may be concave. The second lens 320 may have negative refractive power, and an object-side surface thereof may be convex and an image-side surface thereof may be concave. The third lens 330 may have positive refractive power, and an object-side surface thereof may be convex and an image-side surface thereof may be convex. The fourth lens 340 may have negative refractive power, and an object-side surface thereof may be concave and an image-side surface thereof may be convex. The fifth lens 350 may have positive refractive power, and an object-side surface thereof may be concave and an image-side surface thereof may be convex. The sixth lens 360 may have negative refractive power, and an object-side surface thereof may be concave and an image-side surface thereof may be concave. An inflection point may be formed on the image-side surface of the sixth lens 360.

TABLE 4

| | Surface No. | | | | |
|---|---|---|---|---|---|
| | S1 | S2 | S3 | S4 | S5 |
| K | −3.53382E−01 | −1.71322E+01 | −9.29856E−01 | 9.67621E−01 | −2.11701E+00 |
| A | −7.93217E−04 | −1.07763E−03 | 5.16129E−04 | −1.68969E−04 | −6.71369E−04 |
| B | −1.22970E−04 | −1.65821E−04 | −8.80000E−05 | −4.40000E−05 | −3.60000E−05 |
| C | −2.40000E−05 | −5.70000E−05 | −3.60000E−05 | −1.30000E−05 | 3.10000E−05 |
| D | −7.00000E−06 | −1.80000E−05 | −2.10000E−05 | −6.00000E−06 | 1.30000E−05 |
| E | −3.18776E−07 | −2.94051E−07 | −3.38616E−07 | −1.83511E−08 | 3.31741E−07 |
| F | −1.18015E−07 | −3.00018E−07 | 3.50460E−08 | 1.65326E−08 | −2.49460E−08 |
| G | −2.91933E−08 | −1.52484E−07 | 2.91671E−09 | 5.24786E−09 | −7.75734E−09 |
| H | −5.54449E−09 | 0.00000E+00 | −2.31024E−08 | −5.09835E−09 | 3.64199E−08 |
| J | 0.00000E+00 | 0.00000E+00 | −2.14737E−08 | −6.36860E−09 | 4.45191E−08 |
| | **Surface No.** | | | | |
| | S6 | S9 | S10 | S11 | S12 |
| K | −8.72503E−01 | −7.57229E+00 | −5.12786E+00 | 3.40293E+00 | 1.06844E+01 |
| A | 1.09383E−03 | 4.53908E−03 | 1.85288E−03 | −1.94765E−02 | −3.00510E−02 |
| B | −6.50000E−05 | −2.94497E−04 | −1.28095E−03 | −1.90047E−03 | 2.51932E−03 |
| C | 6.40000E−05 | −1.75234E−04 | −1.01758E−04 | 5.62572E−04 | −3.71327E−04 |
| D | 7.00000E−06 | 3.60000E−05 | 9.80000E−05 | 5.70000E−05 | −3.45786E−06 |
| E | −1.00000E−06 | 1.20000E−05 | −2.00000E−06 | 1.80000E−05 | 1.51634E−06 |
| F | 2.28963E−07 | 3.00000E−06 | 1.00000E−06 | 6.00000E−06 | −4.54979E−07 |
| G | 2.93784E−07 | −1.80589E−07 | 1.00000E−06 | −1.00000E−06 | −9.78721E−09 |
| H | 1.13733E−07 | −2.75508E−07 | 7.15708E−08 | 1.00000E−06 | −3.78100E−08 |
| J | 4.02892E−09 | −9.19668E−09 | −7.85126E−08 | −4.86333E−07 | −6.28419E−08 |

Figure 5:
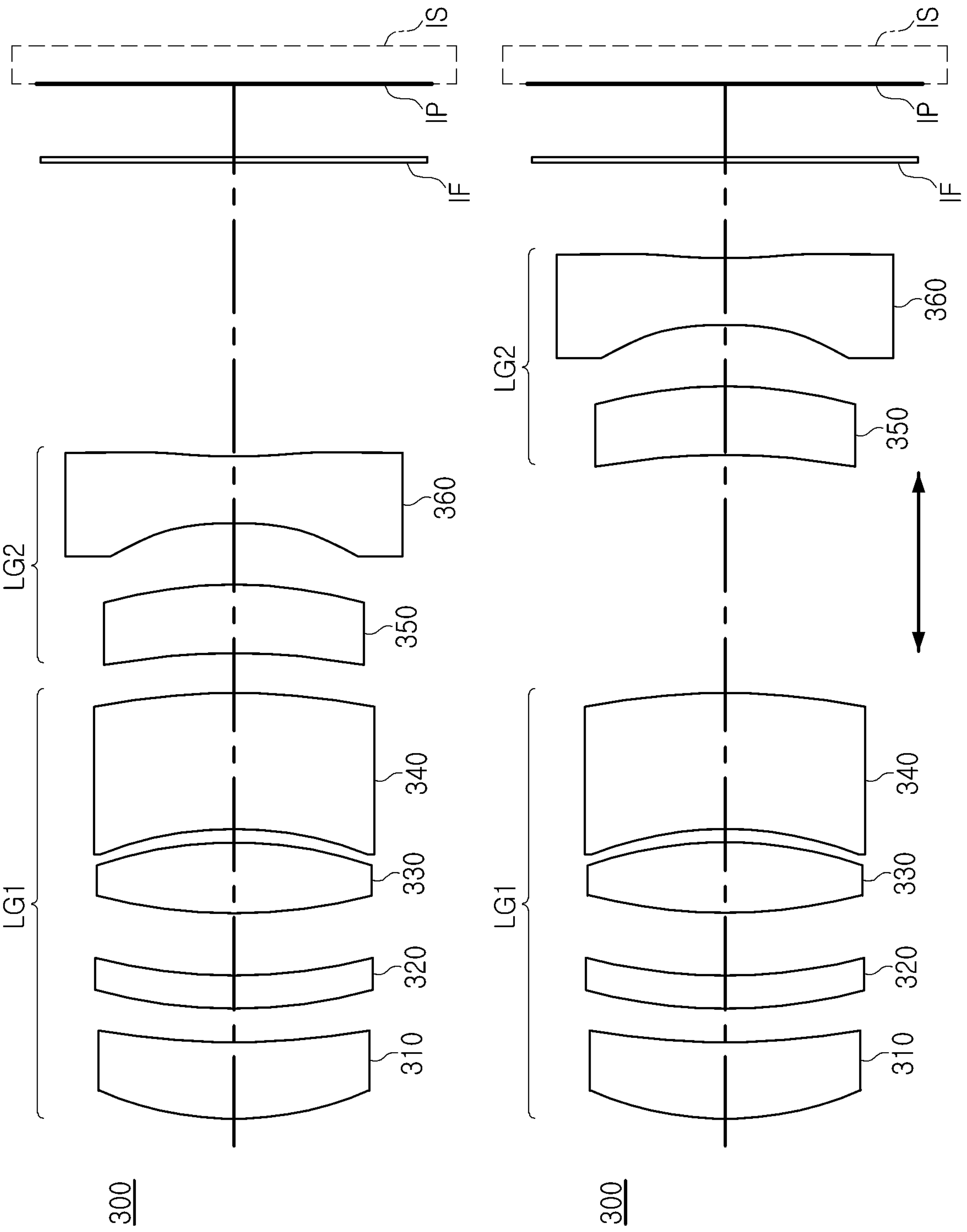
FIG. 5 is a view illustrating an optical imaging system according to a third example embodiment in the present disclosure.

An optical imaging system according to a third example embodiment will be described with reference to FIG. 5.

The optical imaging system 300 according to the third example embodiment may include a first lens group LG1 and a second lens group LG2. The first lens group LG1 may include a first lens 310, a second lens 320, a third lens 330, and a fourth lens 340, and the second lens group LG2 may include a fifth lens 350, and a sixth lens 360. The first lens group LG1 may be configured such that a position thereof with respect to an imaging plane IP is not changed, but the second lens group LG2 may be configured such that a position thereof with respect to the imaging plane IP may be changed. For example, the second lens group LG2 may be moved toward the imaging plane IP side in a state in which The optical imaging system 300 may further include a filter IF and the imaging plane IP. The filter IF may be disposed between the sixth lens 360 and the imaging plane IP. The imaging plane IP may be formed at a position where light incident by the first lens 310 to the sixth lens 360 forms an image. For example, the imaging plane IP may be formed on one surface of an image sensor IS of a camera module or inside the image sensor IS.

Figure 6:
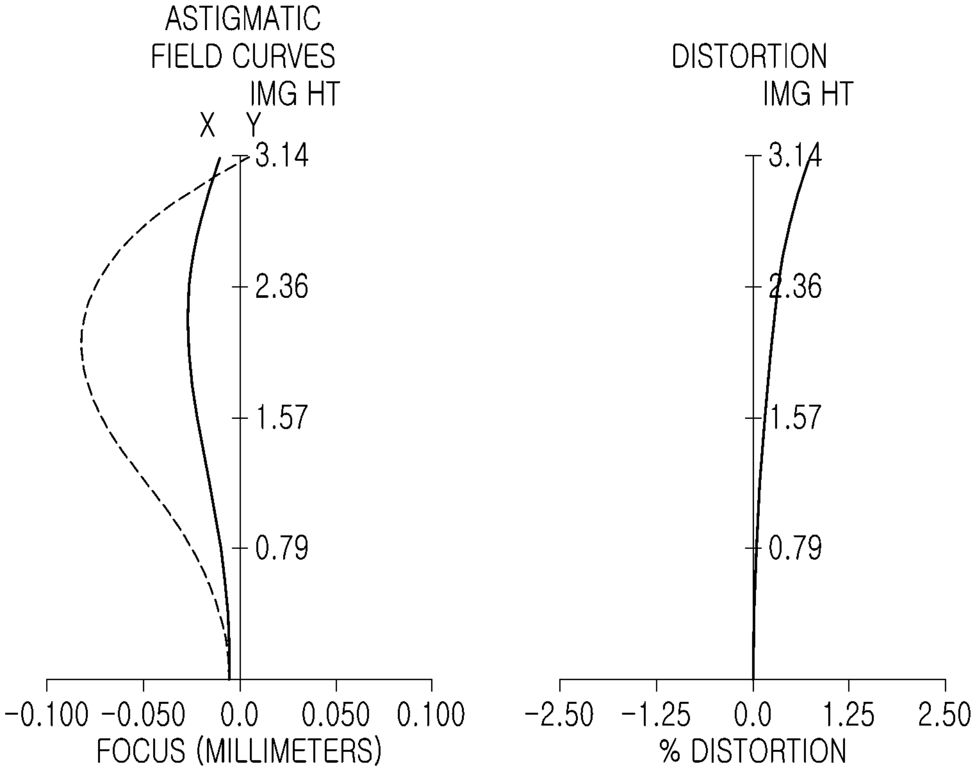
FIG. 6 presents graphs having curves representing aberration characteristics of the optical imaging system illustrated in FIG. 5.

Graphs having curves representing aberration characteristics of the optical imaging system according to the present example embodiment are shown in FIG. 6. Tables 5 and 6 represent characteristics of lenses and aspherical values of the optical imaging system according to the present example embodiment.

TABLE 5

| Surface No. | Component | Radius of Curvature | Thickness/ Distance | Refractive Index | Abbe Number | Effective Radius |
|---|---|---|---|---|---|---|
| S1 | First Lens | 4.5371 | 1.1532 | 1.535 | 55.7 | 2.0 |
| S2 | | 9.5091 | 0.5000 | | | 2.0 |
| S3 | Second Lens | 8.5486 | 0.5000 | 1.535 | 55.7 | 2.0 |
| S4 | | 6.8843 | 0.9298 | | | 2.0 |
| S5 | Third Lens | 8.3255 | 1.0764 | 1.535 | 55.7 | 2.0 |
| S6 | | −4.8617 | 0.2000 | | | 1.9 |
| S7 | Fourth Lens | −5.0284 | 2.0000 | 1.847 | 23.8 | 1.9 |
| S8 | | −11.6864 | 0.6313 | | | 2.0 |
| S9 | Fifth Lens | −5.8853 | 1.0000 | 1.661 | 20.4 | 1.9 |
| S10 | | −5.1216 | 0.9362 | | | 1.9 |
| S11 | Sixth Lens | −5.3356 | 1.0000 | 1.535 | 55.7 | 1.8 |
| S12 | | 7.7336 | 4.3722 | | | 2.0 |
| S13 | Filter | Infinity | 0.1100 | 1.517 | 64.2 | 2.9 |
| S14 | | Infinity | 1.0906 | | | 2.9 |
| S15 | Imaging Plane | Infinity | 0.0053 | | | 3.2 |

side surface thereof may be convex. The second lens 420 may have negative refractive power, and an object-side surface thereof may be concave and an image-side surface thereof may be concave. The third lens 430 may have positive refractive power, and an object-side surface thereof may be convex and an image-side surface thereof may be convex. The fourth lens 440 may have positive refractive power, and an object-side surface thereof may be convex and an image-side surface thereof may be convex. The fifth lens 450 may have negative refractive power, and an object-side surface thereof may be concave and an image-side surface thereof may be concave. The sixth lens 460 may have negative refractive power, and an object-side surface thereof may be concave and an image-side surface thereof may be convex.

The optical imaging system 400 may further include a filter IF and the imaging plane IP. The filter IF may be disposed between the sixth lens 460 and the imaging plane IP. The imaging plane IP may be formed at a position where light incident by the first lens 410 to the sixth lens 460 forms

TABLE 6

| | Surface No. | | | | |
|---|---|---|---|---|---|
| | S1 | S2 | S3 | S4 | S5 |
| K | −7.78370E−01 | −7.42316E+00 | 1.95804E+00 | −2.10761E+00 | 1.32898E−01 |
| A | −7.41054E−04 | −1.43943E−04 | 2.03459E−04 | −5.40313E−04 | −4.90757E−04 |
| B | −1.38728E−04 | −7.60000E−05 | 1.51322E−04 | −1.96347E−04 | 4.00000E−05 |
| C | −1.50000E−05 | −1.10000E−05 | 1.30000E−05 | −2.30000E−05 | 1.00000E−05 |
| D | −2.00000E−06 | −1.00000E−06 | 2.77363E−07 | −1.00000E−06 | 1.00000E−06 |
| E | −1.20325E−07 | −1.01525E−07 | −9.87924E−08 | −1.06934E−07 | 8.69400E−08 |
| F | −7.04244E−09 | −1.86514E−08 | −1.44763E−08 | 2.13027E−10 | −4.38301E−09 |
| G | −4.68407E−11 | −2.43620E−09 | −1.54399E−09 | 9.59884E−10 | 1.18336E−10 |
| H | 1.14739E−11 | −1.01266E−11 | −2.46430E−10 | 8.65875E−11 | 2.16965E−10 |
| J | −1.35278E−11 | 4.16332E−11 | −6.49894E−11 | −9.86239E−11 | 3.67232E−10 |

| | Surface No. | | | | |
|---|---|---|---|---|---|
| | S6 | S9 | S10 | S11 | S12 |
| K | −2.04301E+00 | −1.96111E+01 | −1.27127E+01 | 4.41264E+00 | −1.50746E+01 |
| A | 7.89561E−04 | 3.87679E−03 | 3.03797E−03 | −1.61124E−02 | −1.86544E−02 |
| B | 2.70949E−04 | 5.80000E−05 | −7.51293E−04 | −8.77713E−04 | 2.53006E−03 |
| C | 4.40000E−05 | −3.70000E−05 | −9.60000E−05 | 3.04283E−04 | −1.55907E−04 |
| D | 3.00000E−06 | −4.00000E−06 | 1.60000E−05 | 1.80000E−05 | −2.74488E−06 |
| E | −2.74872E−08 | 3.24882E−07 | 4.00000E−06 | 4.00000E−06 | 1.96635E−06 |
| F | 2.22966E−08 | 3.55549E−07 | 1.36732E−07 | 2.00000E−06 | 2.18286E−07 |
| G | 6.03234E−09 | 7.66030E−08 | −6.58587E−08 | 3.41403E−07 | 4.53269E−09 |
| H | 2.24336E−09 | 7.14866E−09 | −5.51034E−09 | 7.12623E−09 | −2.28886E−09 |
| J | 5.25135E−10 | −2.67024E−09 | 7.18658E−09 | −1.91112E−08 | −7.06925E−10 |

Figure 7:
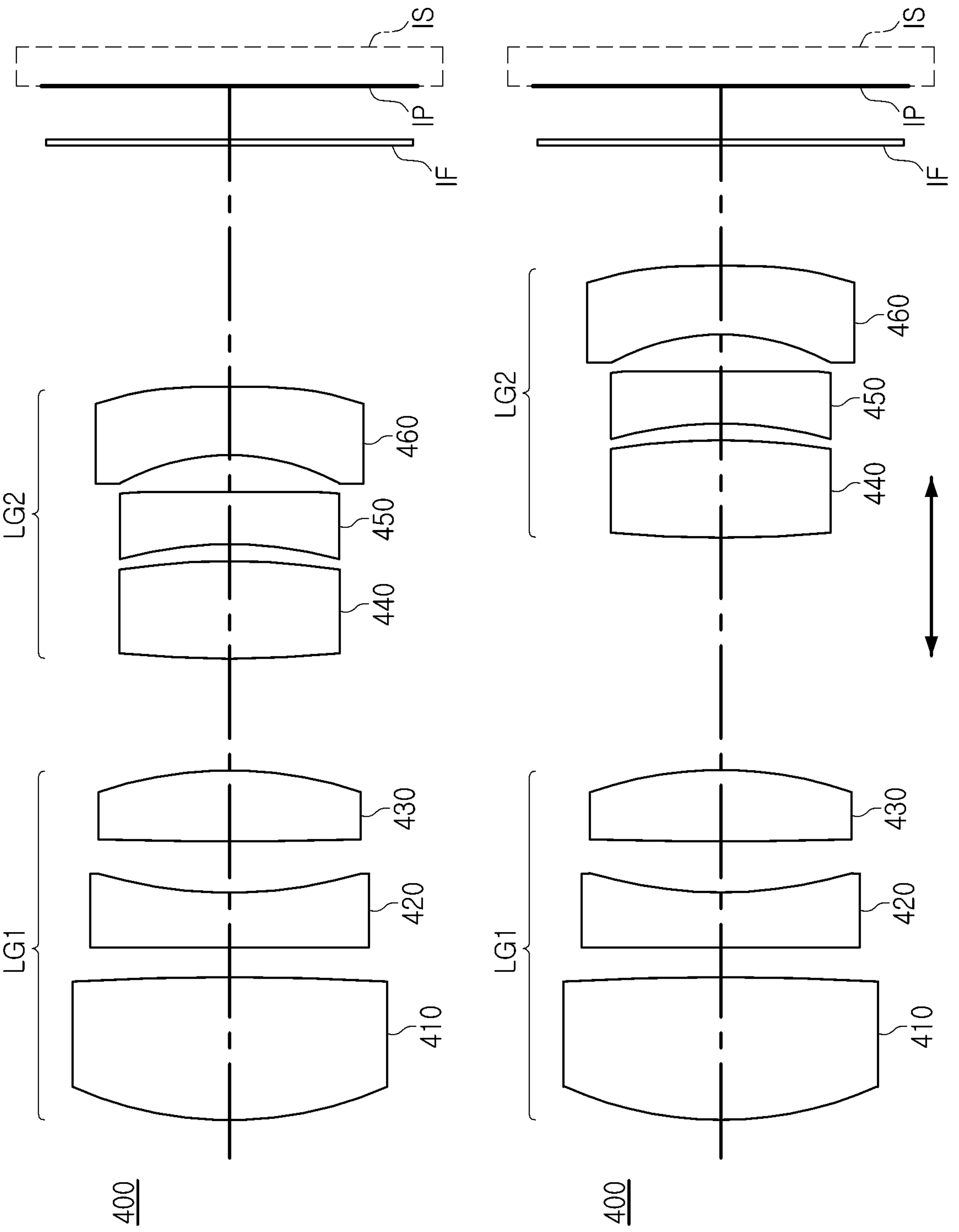
FIG. 7 is a view illustrating an optical imaging system according to a fourth example embodiment in the present disclosure.

An optical imaging system according to a fourth example embodiment will be described with reference to FIG. 7.

The optical imaging system 400 according to the fourth example embodiment may include a first lens group LG1 and a second lens group LG2. The first lens group LG1 may include a first lens 410, a second lens 420, and a third lens 430, and the second lens group LG2 may include a fourth lens 440, a fifth lens 450, and a sixth lens 460. The first lens group LG1 may be configured such that a position thereof with respect to an imaging plane IP is not changed, but the second lens group LG2 may be configured such that a position thereof with respect to the imaging plane IP may be changed. For example, the second lens group LG2 may be moved toward the imaging plane IP side in a state in which it is disposed close to the first lens group LG1, which may enable close-up photography or macrophotography by the optical imaging system 400.

The first lens 410 may have positive refractive power, and an object-side surface thereof may be convex and an image-an image. For example, the imaging plane IP may be formed on one surface of an image sensor IS of a camera module or inside the image sensor IS.

Figure 8:
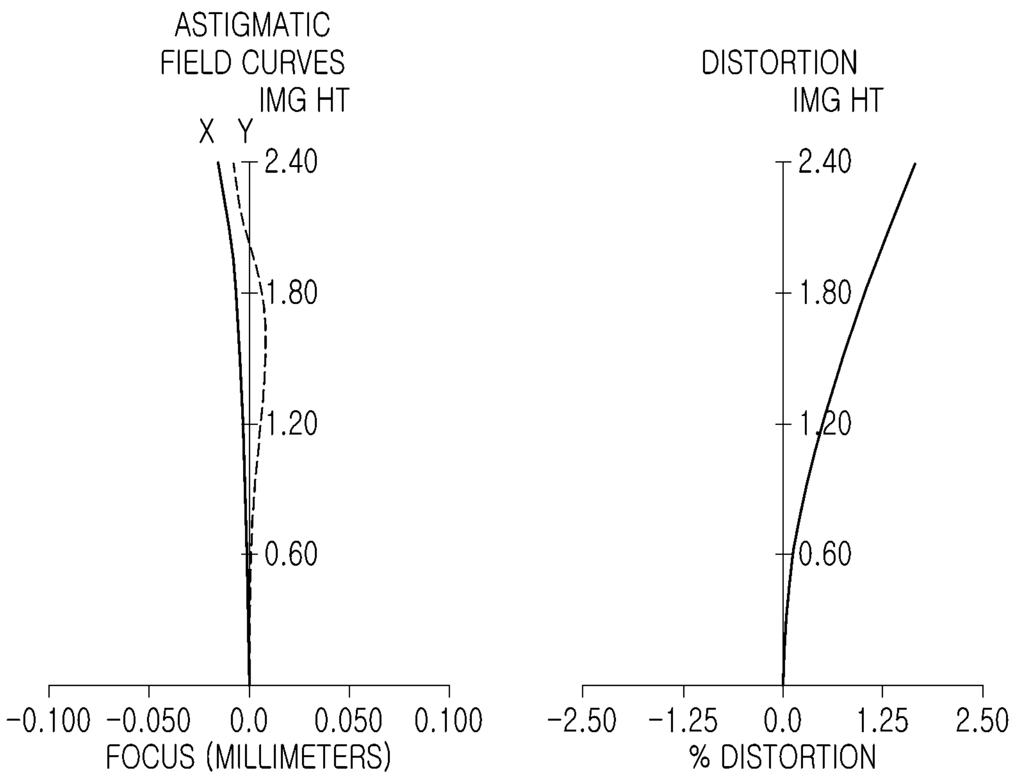
FIG. 8 presents graphs having curves representing aberration characteristics of the optical imaging system illustrated in FIG. 7.

Graphs having curves representing aberration characteristics of the optical imaging system according to the present example embodiment are shown in FIG. 8. Tables 7 and 8 represent characteristics of lenses and aspherical values of the optical imaging system according to the present example embodiment.

TABLE 7

| Surface No. | Component | Radius of Curvature | Thickness/ Distance | Refractive Index | Abbe Number | Effective Radius |
|---|---|---|---|---|---|---|
| S1 | First Lens | 4.6214 | 1.7584 | 1.537 | 55.7 | 2.0 |
| S2 | | −65.8406 | 0.3912 | | | 1.8 |

TABLE 7-continued

| Surface No. | Component | Radius of Curvature | Thickness/ Distance | Refractive Index | Abbe Number | Effective Radius |
|---|---|---|---|---|---|---|
| S3 | Second Lens | −896.5516 | 0.6866 | 1.644 | 23.5 | 1.8 |
| S4 | | 6.1334 | 0.6511 | | | 1.7 |
| S5 | Third Lens | 189.2006 | 0.8557 | 1.537 | 55.7 | 1.7 |
| S6 | | −5.2927 | 1.3993 | | | 1.7 |
| S7 | Fourth Lens | 22.2582 | 1.2000 | 1.667 | 20.4 | 1.4 |
| S8 | | −10.6872 | 0.2146 | | | 1.4 |
| S9 | Fifth Lens | −5.0157 | 0.6542 | 1.570 | 37.4 | 1.4 |
| S10 | | 182.4601 | 0.4480 | | | 1.4 |
| S11 | Sixth Lens | −4.2046 | 0.8604 | 1.644 | 23.5 | 1.4 |
| S12 | | −10.5748 | 3.0000 | | | 1.7 |
| S13 | Filter | Infinity | 0.1577 | 1.517 | 64.2 | 2.3 |
| S14 | | Infinity | 0.5080 | | | 2.3 |
| S15 | Imaging Plane | Infinity | 0.0000 | | | 2.4 |

positive refractive power, and an object-side surface thereof may be convex and an image-side surface thereof may be convex. The fourth lens 540 may have negative refractive power, and an object-side surface thereof may be concave and an image-side surface thereof may be concave. The fifth lens 550 may have positive refractive power, and an object-side surface thereof may be convex and an image-side surface thereof may be concave. The sixth lens 560 may have positive refractive power, and an object-side surface thereof may be convex and an image-side surface thereof may be concave.

The optical imaging system 500 may further include a filter IF and the imaging plane IP. The filter IF may be disposed between the sixth lens 560 and the imaging plane IP. The imaging plane IP may be formed at a position where light incident by the first lens 510 to the sixth lens 560 forms an image. For example, the imaging plane IP may be formed on one surface of an image sensor IS of a camera module or inside the image sensor IS.

TABLE 8

| Surface No. | S1 | S2 | S3 | S4 | S5 | S6 |
|---|---|---|---|---|---|---|
| K | −3.11521E−01 | 0.00000E+00 | −9.90000E+01 | 1.79769E+00 | 0.00000E+00 | −7.41882E−01 |
| A | −6.77991E−04 | 5.27692E−04 | 2.68057E−04 | −8.22489E−04 | 5.30000E−05 | 5.77817E−04 |
| B | −8.40000E−05 | −1.60000E−05 | 1.30000E−05 | −1.86399E−04 | 4.50000E−05 | 1.33372E−04 |
| C | −4.00000E−06 | −1.00000E−05 | 4.00000E−06 | −3.30000E−05 | 1.50000E−05 | 2.40000E−05 |
| D | −1.00000E−06 | −1.00000E−06 | 8.70178E−08 | −2.00000E−06 | 1.00000E−06 | 4.00000E−06 |
| E | −1.34152E−07 | −1.73790E−07 | 1.67950E−08 | 2.41106E−07 | −1.68650E−07 | 1.00000E−06 |
| F | −1.28377E−08 | −2.28071E−08 | −8.56035E−09 | 9.69663E−08 | −1.07104E−07 | −1.33081E−07 |
| G | 4.56556E−10 | −2.00434E−09 | −4.61763E−09 | 2.91500E−08 | −1.28501E−08 | −4.56002E−08 |
| H | 5.57648E−10 | 6.03004E−10 | −5.60670E−10 | 3.05219E−09 | 9.37681E−09 | −8.14018E−10 |
| J | −1.17662E−12 | 7.64694E−10 | 6.75540E−10 | −4.86986E−09 | 1.14398E−08 | 1.45778E−08 |

| Surface No. | S7 | S8 | S9 | S10 | S11 | S12 |
|---|---|---|---|---|---|---|
| K | 0.00000E+00 | 0.00000E+00 | 1.18607E+00 | −9.90000E+01 | 5.70096E+00 | 0.00000E+00 |
| A | 3.51289E−03 | −2.45487E−03 | 2.52600E−04 | −1.34585E−03 | −6.48130E−03 | −7.24755E−03 |
| B | 2.81163E−04 | −3.60414E−04 | 6.30000E−05 | −1.84871E−03 | −1.76403E−03 | −5.53805E−04 |
| C | −1.70868E−04 | −1.51030E−04 | 1.12414E−04 | −3.61649E−04 | −3.86104E−04 | 8.16463E−05 |
| D | −1.40000E−05 | 9.00000E−05 | 5.89574E−04 | −3.00000E−06 | −1.09570E−04 | −1.08527E−04 |
| E | 6.00000E−06 | 2.10000E−05 | −2.90000E−05 | −3.50000E−05 | 1.80000E−05 | 4.64652E−05 |
| F | −1.00000E−06 | 3.70000E−05 | −6.00000E−06 | 3.00000E−06 | 9.00000E−06 | 2.53930E−07 |
| G | 6.00000E−06 | 7.00000E−06 | 1.10000E−05 | 1.00000E−06 | −6.00000E−06 | −1.55579E−06 |
| H | −2.08084E−07 | −2.00000E−06 | 5.00000E−06 | −1.00000E−06 | −2.00000E−06 | −5.59015E−07 |
| J | −1.00000E−06 | −1.00000E−06 | −2.00000E−06 | −2.00000E−06 | 1.00000E−06 | 1.72537E−07 |

Figure 9:
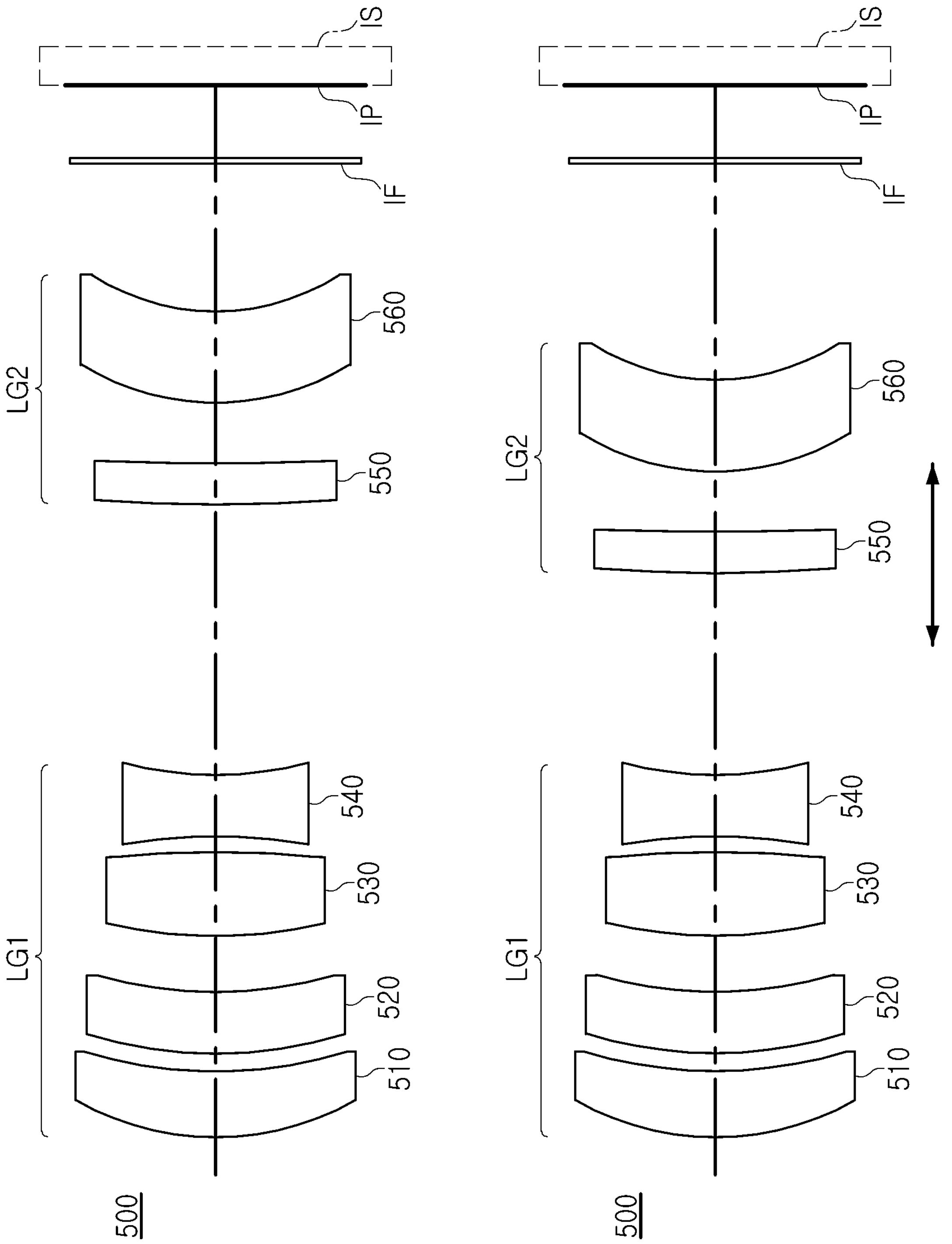
FIG. 9 is a view illustrating an optical imaging system according to a fifth example embodiment in the present disclosure.

An optical imaging system according to a fifth example embodiment will be described with reference to FIG. 9.

The optical imaging system 500 according to the fifth example embodiment may include a first lens group LG1 and a second lens group LG2. The first lens group LG1 may include a first lens 510, a second lens 520, a third lens 530, and a fourth lens 540, and the second lens group LG2 may include a fifth lens 550, and a sixth lens 560. The first lens group LG1 may be configured such that a position thereof with respect to an imaging plane IP is not changed, but the second lens group LG2 may be configured such that a position thereof with respect to the imaging plane IP may be changed. For example, the second lens group LG2 may be moved toward the imaging plane IP side in a state in which it is disposed close to the first lens group LG1, which may enable close-up photography or macrophotography by the optical imaging system 500.

Figure 10:
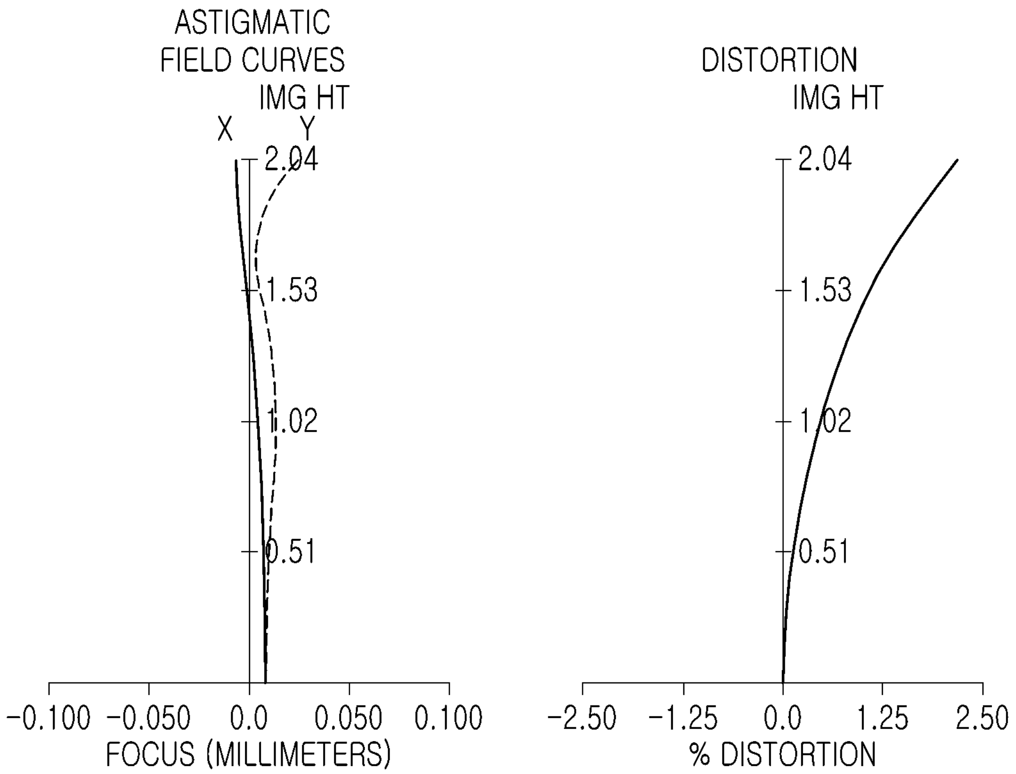
FIG. 10 presents graphs having curves representing aberration characteristics of the optical imaging system illustrated in FIG. 9.

The first lens 510 may have positive refractive power, and an object-side surface thereof may be convex and an image-side surface thereof may be concave. The second lens 520 may have positive refractive power, and an object-side surface thereof may be convex and an image-side surface thereof may be concave. The third lens 530 may have Graphs having curves representing aberration characteristics of the optical imaging system according to the present example embodiment are shown in FIG. 10. Tables 9 and 10 represent characteristics of lenses and aspherical values of the optical imaging system according to the present example embodiment.

TABLE 9

| Surface No. | Component | Radius of Curvature | Thickness/ Distance | Refractive Index | Abbe Number | Effective Radius |
|---|---|---|---|---|---|---|
| S1 | First Lens | 3.5752 | 0.8631 | 1.537 | 55.7 | 1.8 |
| S2 | | 6.0232 | 0.2000 | | | 1.7 |
| S3 | Second Lens | 5.3486 | 0.8001 | 1.537 | 55.7 | 1.7 |
| S4 | | 5.3305 | 0.7164 | | | 1.5 |
| S5 | Third Lens | 6.5618 | 1.0395 | 1.537 | 55.7 | 1.4 |
| S6 | | −9.8226 | 0.1917 | | | 1.3 |
| S7 | Fourth Lens | −7.0707 | 0.7942 | 1.620 | 25.9 | 1.2 |
| S8 | | 5.4758 | 3.4089 | | | 1.2 |
| S9 | Fifth Lens | 15.7602 | 0.5706 | 1.679 | 19.2 | 1.5 |
| S10 | | 493.0400 | 0.7046 | | | 1.6 |
| S11 | Sixth Lens | 3.5774 | 1.1625 | 1.537 | 55.7 | 1.7 |
| S12 | | 3.2189 | 1.8397 | | | 1.6 |

TABLE 9-continued

| Surface No. | Component | Radius of Curvature | Thickness/ Distance | Refractive Index | Abbe Number | Effective Radius |
|---|---|---|---|---|---|---|
| S13 | Filter | Infinity | 0.1100 | 1.517 | 64.2 | 1.9 |
| S14 | | Infinity | 0.9065 | | | 1.9 |
| S15 | Imaging Plane | Infinity | 0.0000 | | | 2.0 |

TABLE 10

| Surface No. | S1 | S2 | S3 | S4 | S5 | S6 |
|---|---|---|---|---|---|---|
| K | −2.41363E−02 | 2.17275E−01 | −2.40385E+00 | −3.44309E+00 | 4.52972E−01 | −1.34209E−01 |
| A | 1.61007E−04 | 6.80000E−05 | −1.04574E−04 | −2.48709E−04 | −8.10000E−05 | 1.03764E−03 |
| B | −1.11236E−04 | −3.60000E−05 | 8.00000E−05 | −1.80565E−04 | −2.45949E−04 | 8.59886E−04 |
| C | −9.00000E−06 | −4.30000E−05 | 5.70000E−05 | −9.60000E−05 | −7.80000E−05 | 2.57213E−04 |
| D | −1.10000E−05 | 3.00000E−06 | 7.00000E−06 | −1.30000E−05 | −1.70000E−05 | 2.30000E−05 |
| E | 7.03485E−08 | 1.14430E−07 | −1.91313E−07 | 1.00000E−06 | −4.47129E−07 | −7.00000E−06 |
| F | 1.22724E−08 | 6.59404E−09 | 1.65789E−09 | 6.39245E−08 | 7.43724E−08 | −3.00000E−06 |
| G | −1.47646E−09 | −6.81024E−10 | 9.05581E−09 | 1.00966E−08 | −2.03450E−08 | −1.00000E−06 |
| H | 0.00000E+00 | 0.00000E+00 | 3.09321E−09 | 9.16931E−09 | −4.90123E−08 | −2.54852E−07 |
| J | 0.00000E+00 | 0.00000E+00 | 0.00000E+00 | 6.94183E−09 | −3.50081E−08 | −8.51933E−08 |

| Surface No. | S7 | S8 | S9 | S10 | S11 | S12 |
|---|---|---|---|---|---|---|
| K | −2.50018E−01 | 7.49777E+00 | 1.25204E+01 | 9.90000E+01 | −2.02912E+00 | −8.33433E−01 |
| A | 7.72543E−04 | 6.11142E−04 | −3.18624E−03 | −3.92654E−03 | 7.05886E−03 | 8.36320E−03 |
| B | −1.04821E−04 | −1.64899E−03 | −4.64782E−04 | 2.80000E−05 | 5.11971E−04 | 5.60648E−04 |
| C | 2.00000E−05 | −5.09402E−04 | −5.00000E−06 | −9.00000E−06 | 1.60795E−04 | 1.64522E−04 |
| D | 2.90000E−05 | −1.50000E−05 | 4.00000E−06 | 1.60168E−07 | −3.00000E−05 | 4.07983E−05 |
| E | −1.70000E−05 | −1.80000E−05 | 2.00000E−06 | 1.00000E−06 | −4.99382E−07 | 8.73278E−06 |
| F | −1.00000E−06 | 4.00000E−06 | 2.61276E−07 | 1.64289E−07 | 2.00000E−06 | −1.46435E−06 |
| G | 5.55648E−09 | 1.00000E−06 | −3.62716E−08 | 2.15688E−08 | −2.17690E−07 | −5.44712E−07 |
| H | 2.52742E−07 | 1.00000E−06 | −3.32058E−08 | −8.38672E−09 | −3.08058E−09 | −6.86539E−08 |
| J | 2.87657E−07 | 2.00000E−06 | −1.27029E−08 | −8.98591E−09 | −8.50459E−10 | 3.30339E−08 |

Figure 11:
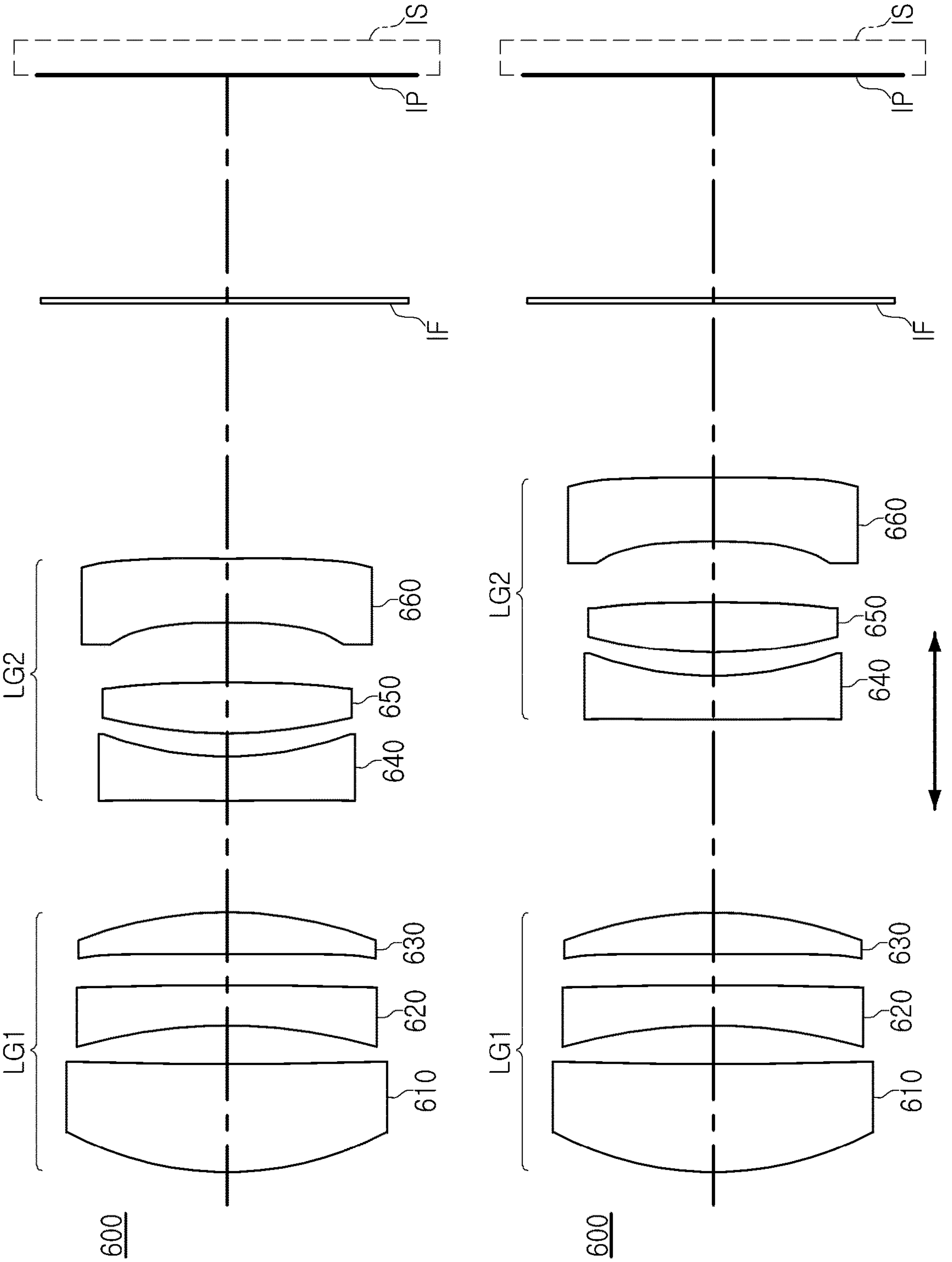
FIG. 11 is a view illustrating an optical imaging system according to a sixth example embodiment in the present disclosure.

An optical imaging system according to a sixth example embodiment will be described with reference to FIG. 11.

The optical imaging system 600 according to the sixth example embodiment may include a first lens group LG1 and a second lens group LG2. The first lens group LG1 may include a first lens 610, a second lens 620, and a third lens 630, and the second lens group LG2 may include a fourth lens 640, a fifth lens 650, and a sixth lens 660. The first lens group LG1 may be configured such that a position thereof with respect to an imaging plane IP is not changed, but the second lens group LG2 may be configured such that a position thereof with respect to the imaging plane IP may be changed. For example, the second lens group LG2 may be moved toward the imaging plane IP side in a state in which it is disposed close to the first lens group LG1, which may enable close-up photography or macrophotography by the optical imaging system 600.

The first lens 610 may have positive refractive power, and an object-side surface thereof may be convex and an image-side surface thereof may be concave. The second lens 620 may have negative refractive power, and an object-side surface thereof may be concave and an image-side surface thereof may be convex. The third lens 630 may have positive refractive power, and an object-side surface thereof may be concave and an image-side surface thereof may be convex. The fourth lens 640 may have negative refractive power, and an object-side surface thereof may be convex and an image-side surface thereof may be concave. The fifth lens 650 may have positive refractive power, and an object-side surface thereof may be convex and an image-side surface thereof may be convex. The sixth lens 660 may have negative refractive power, and an object-side surface thereof may be concave and an image-side surface thereof may be concave. An inflection point may be formed on the image-side surface of the sixth lens 660.

The optical imaging system 600 may further include a filter IF and the imaging plane IP. The filter IF may be disposed between the sixth lens 660 and the imaging plane IP. The imaging plane IP may be formed at a position where light incident by the first lens 610 to the sixth lens 660 forms an image. For example, the imaging plane IP may be formed on one surface of an image sensor IS of a camera module or inside the image sensor IS.

Figure 12:
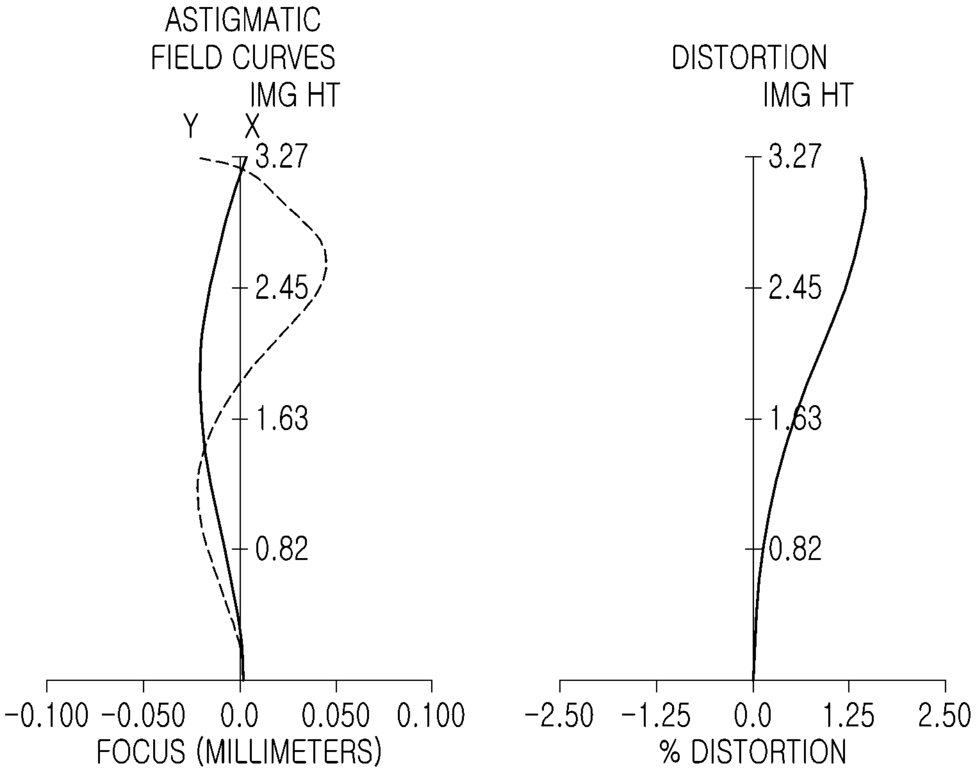
FIG. 12 presents graphs having curves representing aberration characteristics of the optical imaging system illustrated in FIG. 11.

Graphs having curves representing aberration characteristics of the optical imaging system according to the present example embodiment are shown in FIG. 12. Tables 11 and 12 represent characteristics of lenses and aspherical values of the optical imaging system according to the present example embodiment.

TABLE 11

| Surface No. | Component | Radius of Curvature | Thickness/ Distance | Refractive Index | Abbe Number | Effective Radius |
|---|---|---|---|---|---|---|
| S1 | First Lens | 4.1485 | 1.4189 | 1.537 | 55.7 | 2.0 |
| S2 | | 88.4995 | 0.4580 | | | 1.9 |
| S3 | Second Lens | −5.8242 | 0.5000 | 1.644 | 23.5 | 1.9 |
| S4 | | −220.7476 | 0.4135 | | | 1.9 |
| S5 | Third Lens | −114.8086 | 0.5069 | 1.537 | 55.7 | 1.8 |
| S6 | | −4.9122 | 1.4413 | | | 1.9 |
| S7 | Fourth Lens | 484.0130 | 0.5519 | 1.570 | 37.4 | 1.6 |
| S8 | | 4.0639 | 0.3000 | | | 1.5 |
| S9 | Fifth Lens | 7.6020 | 0.6519 | 1.667 | 20.4 | 1.6 |
| S10 | | −10.9056 | 0.7649 | | | 1.5 |
| S11 | Sixth Lens | −5.3910 | 0.8000 | 1.644 | 23.5 | 1.5 |
| S12 | | 788.5557 | 3.2498 | | | 1.8 |
| S13 | Filter | Infinity | 0.1100 | 1.517 | 64.2 | 2.5 |
| S14 | | Infinity | 2.7978 | | | 2.5 |
| S15 | Imaging Plane | Infinity | −0.0087 | | | 3.3 |

TABLE 12

| Surface No. | S1 | S2 | S3 | S4 | S5 | S6 |
|---|---|---|---|---|---|---|
| K | 8.31856E−02 | −9.90000E+01 | 1.54423E+00 | 9.90000E+01 | 9.90000E+01 | −3.21601E+00 |
| A | −2.60000E−05 | 6.50000E−05 | 1.79253E−03 | −8.89934E−04 | −1.35458E−03 | 2.23982E−04 |
| B | −6.90000E−05 | −7.90000E−05 | 3.80865E−04 | −1.20000E−05 | −4.03572E−04 | 1.60000E−05 |
| C | −2.00000E−06 | −2.40000E−05 | 7.30000E−05 | 4.00000E−06 | −8.80000E−05 | −2.00000E−05 |
| D | −3.00000E−06 | −4.00000E−06 | 3.00000E−06 | 3.00000E−06 | −1.60000E−05 | −4.00000E−06 |
| E | −4.85705E−07 | −1.00000E−06 | −2.00000E−06 | 7.29797E−08 | −4.00000E−06 | −1.00000E−06 |
| F | −4.51555E−08 | −1.08849E−07 | −3.76756E−07 | −5.54296E−08 | 1.00000E−06 | −3.58854E−07 |
| G | 2.28756E−09 | −1.59434E−08 | −1.16202E−08 | −1.80675E−08 | 1.72328E−07 | −9.35645E−08 |
| H | 6.27507E−10 | 4.16006E−11 | 3.58556E−09 | 8.87599E−10 | 5.37023E−08 | −2.52621E−09 |
| J | −6.45896E−10 | 1.81432E−09 | 6.93709E−09 | 3.80255E−09 | −1.88469E−08 | 1.44777E−08 |
| Surface No. | S7 | S8 | S9 | S10 | S11 | S12 |
| K | −9.90000E+01 | −8.03955E−01 | 2.10270E+00 | −7.40844E+00 | 7.88681E+00 | 9.90000E+01 |
| A | 1.33262E−03 | −1.25945E−03 | 4.37157E−04 | 1.04368E−03 | −3.13836E−03 | −8.32453E−03 |
| B | −1.17093E−04 | −3.60000E−05 | 2.45883E−04 | −5.70000E−05 | −1.52324E−03 | −4.67965E−04 |
| C | −6.90000E−05 | 3.50000E−05 | 1.82212E−04 | −1.30987E−04 | −2.49639E−04 | −4.63280E−04 |
| D | −2.70000E−05 | 1.00000E−05 | 1.11455E−04 | −1.13031E−04 | −1.10000E−05 | 2.31124E−04 |
| E | 3.00000E−06 | −1.20000E−05 | 8.20000E−05 | 1.23886E−04 | −1.70000E−05 | −3.71960E−05 |
| F | −8.00000E−06 | 1.00000E−06 | 3.00000E−06 | 4.00000E−06 | −1.00000E−06 | −9.47222E−06 |
| G | 1.51875E−07 | −1.00000E−06 | 4.35567E−07 | 1.00000E−06 | −1.24398E−07 | 1.67607E−06 |
| H | 1.30337E−07 | 4.08537E−07 | 5.98304E−08 | 1.00000E−06 | −4.00617E−07 | 7.40135E−07 |
| J | 7.03110E−08 | 2.86677E−08 | 5.72158E−08 | 2.89710E−07 | −3.11855E−07 | −1.56542E−07 |

Figure 13:
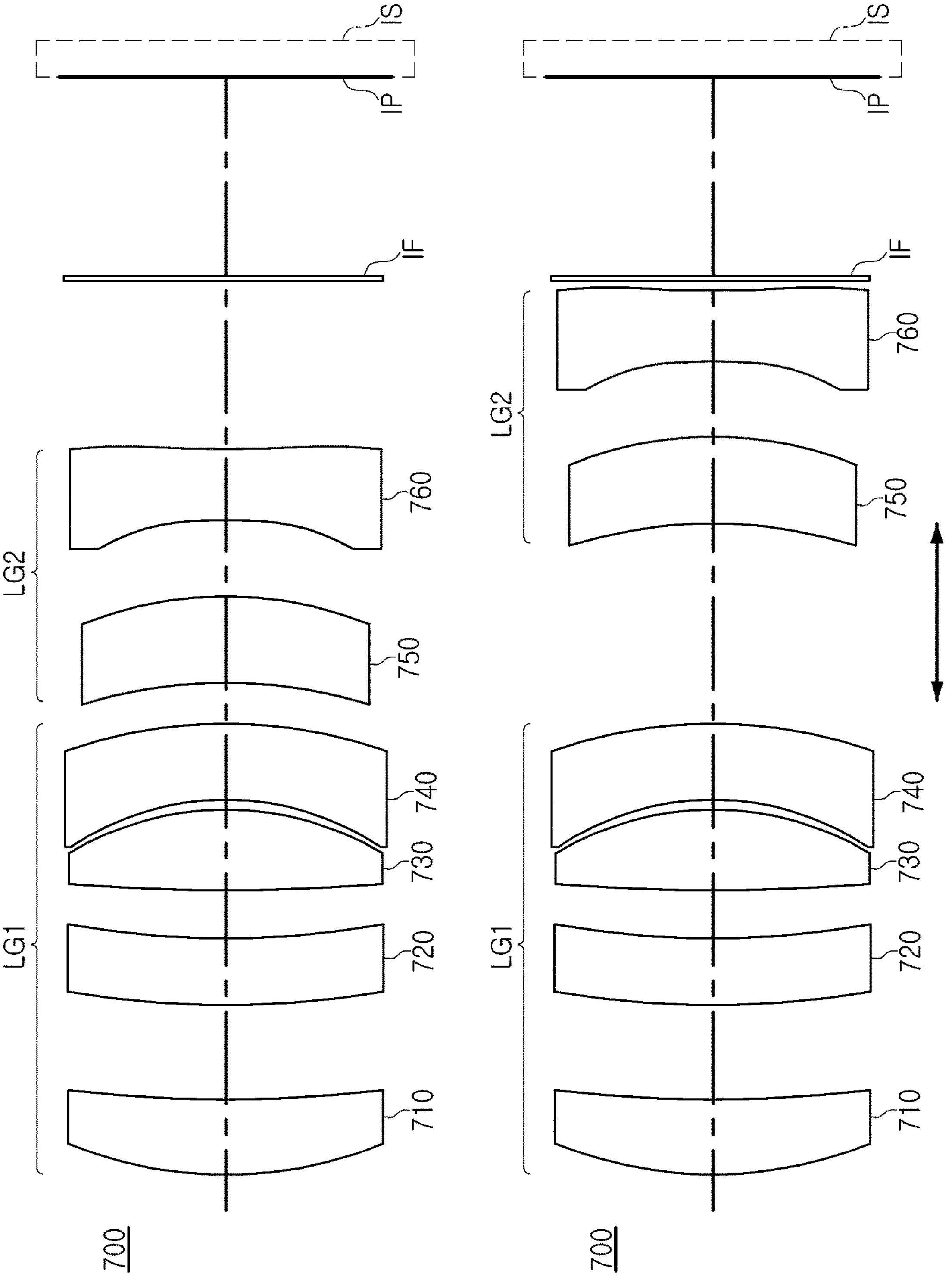
FIG. 13 is a view illustrating an optical imaging system according to a seventh example embodiment in the present disclosure.

An optical imaging system according to a seventh example embodiment will be described with reference to FIG. 13.

The optical imaging system 700 according to the seventh example embodiment may include a first lens group LG1 and a second lens group LG2. The first lens group LG1 may include a first lens 710, a second lens 720, and a third lens 730, and the second lens group LG2 may include a fourth lens 740, a fifth lens 750, and a sixth lens 760. The first lens group LG1 may be configured such that a position thereof with respect to an imaging plane IP is not changed, but the second lens group LG2 may be configured such that a position thereof with respect to the imaging plane IP may be changed. For example, the second lens group LG2 may be moved toward the imaging plane IP side in a state in which it is disposed close to the first lens group LG1, which may enable close-up photography or macrophotography by the optical imaging system 700.

The first lens 710 may have positive refractive power, and an object-side surface thereof may be convex and an image-side surface thereof may be concave. The second lens 720 may have negative refractive power, and an object-side surface thereof may be convex and an image-side surface thereof may be concave. The third lens 730 may have positive refractive power, and an object-side surface thereof may be convex and an image-side surface thereof may be convex. The fourth lens 740 may have negative refractive power, and an object-side surface thereof may be concave and an image-side surface thereof may be convex. The fifth lens 750 may have positive refractive power, and an object-side surface thereof may be concave and an image-side surface thereof may be convex. The sixth lens 760 may have negative refractive power, and an object-side surface thereof may be concave and an image-side surface thereof may be concave. An inflection point may be formed on the image-side surface of the sixth lens 760.

The optical imaging system 700 may further include a filter IF and the imaging plane IP. The filter IF may be disposed between the sixth lens 760 and the imaging plane IP. The imaging plane IP may be formed at a position where light incident by the first lens 710 to the sixth lens 760 forms an image. For example, the imaging plane IP may be formed on one surface of an image sensor IS of a camera module or inside the image sensor IS.

Figure 14:
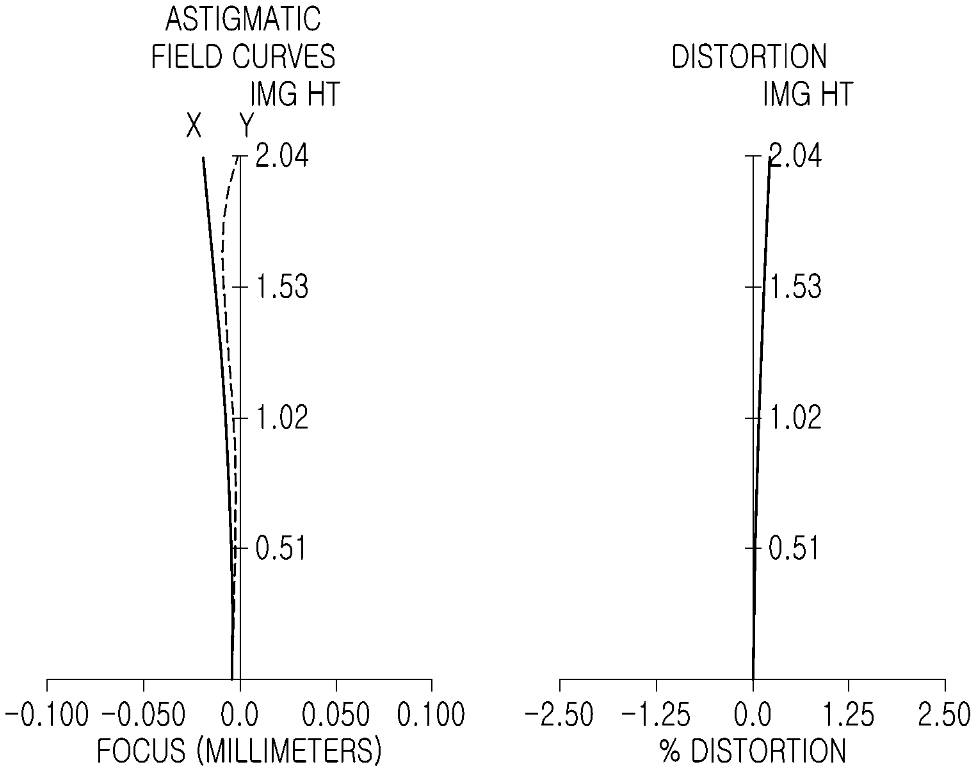
FIG. 14 presents graphs having curves representing aberration characteristics of the optical imaging system illustrated in FIG. 13.

Graphs having curves representing aberration characteristics of the optical imaging system according to the present example embodiment are shown in FIG. 14. Tables 13 and 14 represent characteristics of lenses and aspherical values of the optical imaging system according to the present example embodiment.

TABLE 13

| Surface No. | Component | Radius of Curvature | Thickness/ Distance | Refractive Index | Abbe Number | Effective Radius |
|---|---|---|---|---|---|---|
| S1 | First Lens | 4.3728 | 0.8516 | 1.537 | 55.7 | 1.8 |
| S2 | | 11.9749 | 1.0766 | | | 1.7 |
| S3 | Second Lens | 11.2614 | 0.7576 | 1.537 | 55.7 | 1.8 |
| S4 | | 10.7421 | 0.5483 | | | 1.7 |
| S5 | Third Lens | 30.0770 | 0.8960 | 1.537 | 55.7 | 1.7 |
| S6 | | −3.2180 | 0.1000 | | | 1.7 |
| S7 | Fourth Lens | −3.0090 | 0.8653 | 1.679 | 19.2 | 1.7 |
| S8 | | −5.1152 | 0.4741 | | | 1.8 |
| S9 | Fifth Lens | −3.8904 | 1.0000 | 1.668 | 20.4 | 1.6 |
| S10 | | −3.3166 | 0.8466 | | | 1.6 |
| S11 | Sixth Lens | −4.3576 | 0.8000 | 1.537 | 55.7 | 1.4 |
| S12 | | 9.3111 | 1.8991 | | | 1.6 |
| S13 | Filter | Infinity | 0.1100 | 1.517 | 64.2 | 1.8 |
| S14 | | Infinity | 2.1648 | | | 1.8 |
| S15 | Imaging Plane | Infinity | 0.0038 | | | 2.0 |

TABLE 14

| Surface No. | S1 | S2 | S3 | S4 | S5 | S6 |
|---|---|---|---|---|---|---|
| K | −4.55237E−01 | −1.12829E+01 | −1.46440E+00 | 3.11879E+00 | −9.90000E+01 | −5.56441E−01 |
| A | −9.87262E−04 | −8.83469E−04 | −2.20182E−04 | −1.04519E−04 | −1.03860E−03 | 2.15577E−04 |
| B | −1.28270E−04 | −1.19835E−04 | 2.70000E−05 | −6.10000E−05 | 2.40000E−05 | −2.21995E−04 |
| C | −2.40000E−05 | −3.10000E−05 | −6.00000E−06 | −2.70000E−05 | 4.30000E−05 | 5.40000E−05 |
| D | −6.00000E−06 | −1.00000E−05 | −1.00000E−06 | 4.00000E−06 | 2.00000E−06 | 1.80000E−05 |
| E | 2.90380E−07 | 2.00000E−06 | −1.00000E−06 | −6.00000E−06 | −3.00000E−06 | 2.00000E−06 |
| F | 7.06262E−08 | 2.93841E−07 | 8.66004E−09 | −2.00000E−06 | −1.00000E−06 | 2.69619E−07 |
| G | 1.04953E−08 | 2.40976E−09 | −4.52979E−09 | −1.57859E−08 | 1.97422E−07 | −2.13165E−07 |
| H | −3.32599E−11 | 0.00000E+00 | −3.18003E−08 | 1.80364E−07 | 8.11374E−08 | −1.85956E−08 |
| J | 0.00000E+00 | 0.00000E+00 | 6.46611E−08 | 1.90692E−07 | 6.71784E−08 | 6.57249E−09 |

| Surface No. | S7 | S8 | S9 | S10 | S11 | S12 |
|---|---|---|---|---|---|---|
| K | −8.84430E−02 | 2.65220E−01 | −7.08972E+00 | −5.11014E+00 | 3.25616E+00 | 1.54771E+01 |
| A | 4.03510E−04 | −1.84176E−04 | 4.39126E−03 | 2.23334E−03 | −1.77715E−02 | −3.16935E−02 |
| B | 1.12159E−04 | 2.06342E−04 | −2.54833E−04 | −1.47462E−03 | −2.22507E−03 | 3.71137E−03 |
| C | 5.10000E−05 | 5.10000E−05 | −2.67980E−04 | −2.22545E−04 | 6.60662E−04 | −2.24257E−04 |
| D | 1.60000E−05 | 3.00000E−06 | 7.00000E−06 | 6.00000E−05 | 1.51582E−04 | −1.90633E−05 |
| E | 2.00000E−06 | −4.00000E−06 | 4.00000E−06 | −7.00000E−06 | −7.00000E−06 | 1.91388E−05 |
| F | 1.00000E−06 | 4.40597E−07 | 3.00000E−06 | −2.45934E−07 | −4.00000E−06 | −2.75613E−06 |
| G | 1.59132E−07 | 2.16543E−07 | −2.00000E−06 | −1.65031E−07 | −5.00000E−06 | −8.52058E−07 |
| H | 0.00000E+00 | 0.00000E+00 | −1.00000E−06 | −7.30703E−08 | 1.00000E−06 | −9.31438E−08 |
| J | 0.00000E+00 | 0.00000E+00 | 4.08910E−07 | 2.09745E−07 | 2.00000E−06 | 1.52511E−07 |

Figure 15:
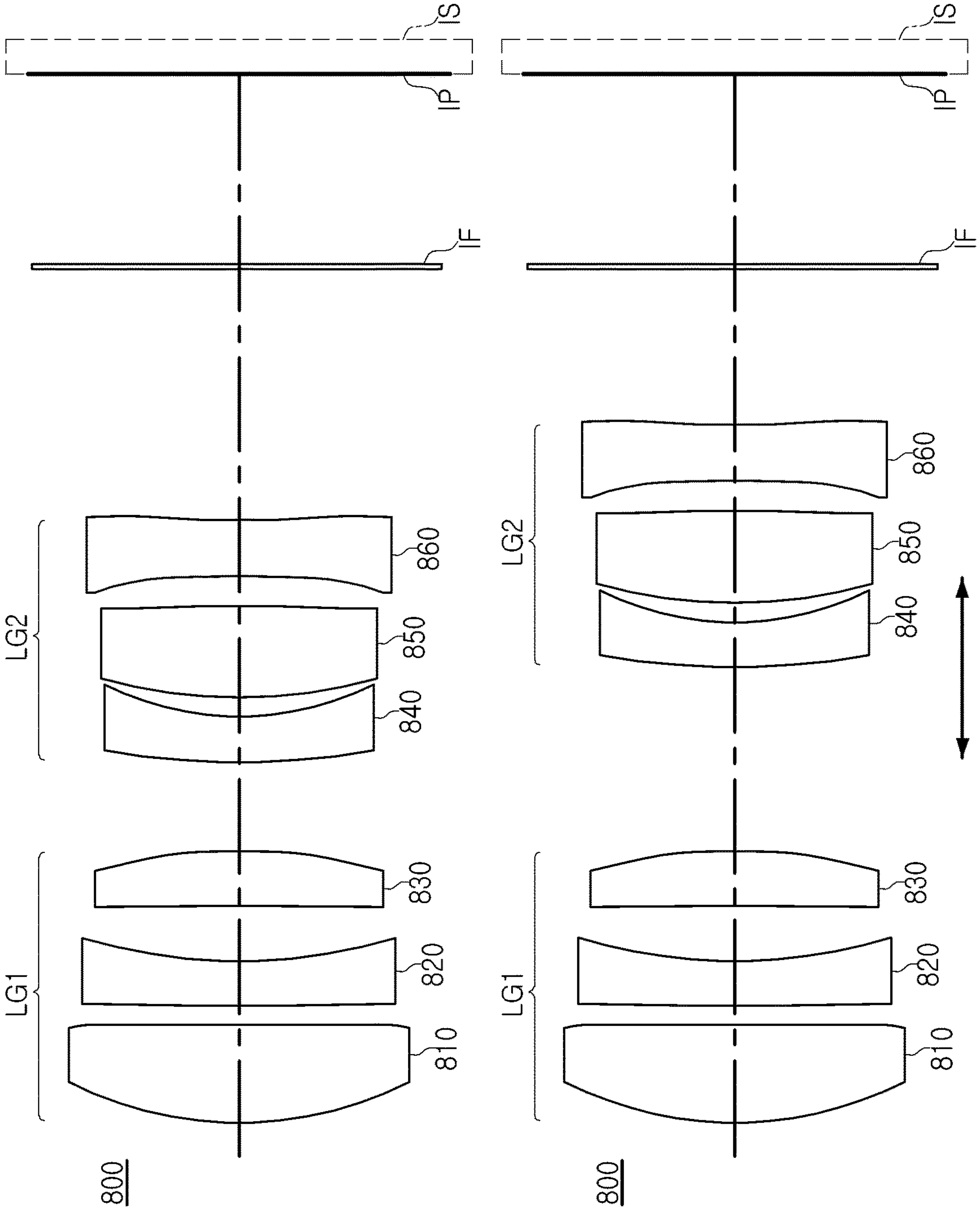
FIG. 15 is a view illustrating an optical imaging system according to an eighth example embodiment in the present disclosure.

An optical imaging system according to an eighth example embodiment will be described with reference to FIG. 15.

The optical imaging system 800 according to the eighth example embodiment may include a first lens group LG1 and a second lens group LG2. The first lens group LG1 may include a first lens 810, a second lens 820, and a third lens 830, and the second lens group LG2 may include a fourth lens 840, a fifth lens 850, and a sixth lens 860. The first lens group LG1 may be configured such that a position thereof with respect to an imaging plane IP is not changed, but the second lens group LG2 may be configured such that a position thereof with respect to the imaging plane IP may be changed. For example, the second lens group LG2 may be moved toward the imaging plane IP side in a state in which it is disposed close to the first lens group LG1, which may enable close-up photography or macrophotography by the optical imaging system 800.

The first lens 810 may have positive refractive power, and an object-side surface thereof may be convex and an image-side surface thereof may be concave. The second lens 820 may have negative refractive power, and an object-side surface thereof may be convex and an image-side surface thereof may be concave. The third lens 830 may have positive refractive power, and an object-side surface thereof may be concave and an image-side surface thereof may be convex. The fourth lens 840 may have negative refractive power, and an object-side surface thereof may be convex and an image-side surface thereof may be concave. The fifth lens 850 may have positive refractive power, and an object-side surface thereof may be convex and an image-side surface thereof may be convex. The sixth lens 860 may have negative refractive power, and an object-side surface thereof may be concave and an image-side surface thereof may be concave. An inflection point may be formed on the image-side surface of the sixth lens 860.

The optical imaging system 800 may further include a filter IF and the imaging plane IP. The filter IF may be disposed between the sixth lens 860 and the imaging plane IP. The imaging plane IP may be formed at a position where light incident by the first lens 810 to the sixth lens 860 forms an image. For example, the imaging plane IP may be formed on one surface of an image sensor IS of a camera module or inside the image sensor IS.

Figure 16:
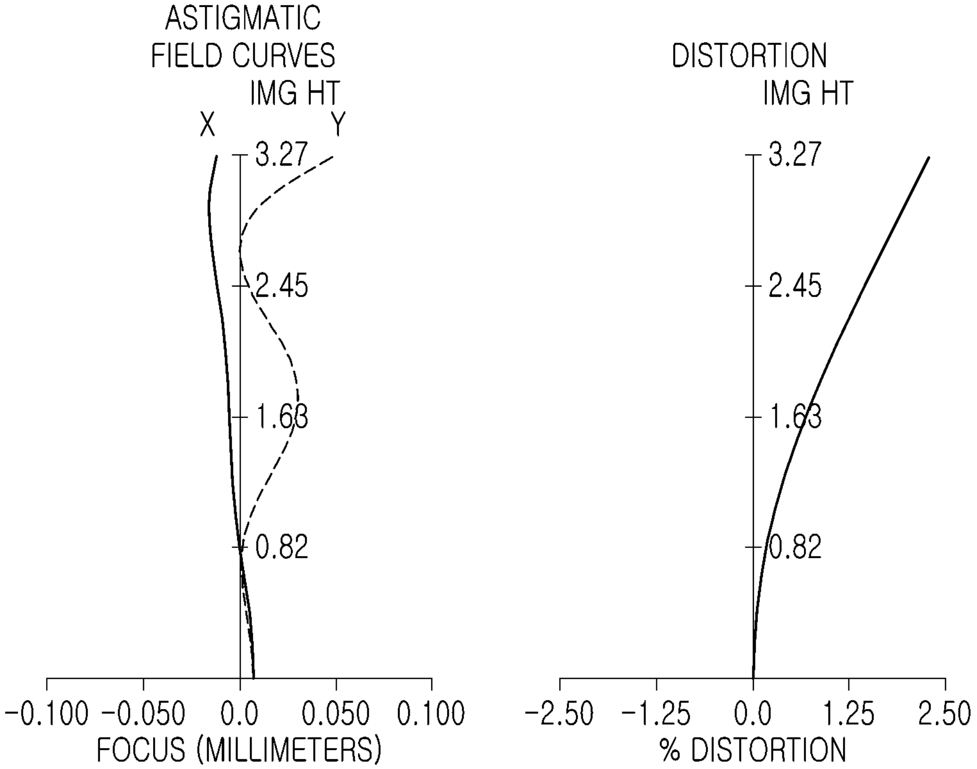
FIG. 16 presents graphs having curves representing aberration characteristics of the optical imaging system illustrated in FIG. 15.

Graphs having curves representing aberration characteristics of the optical imaging system according to the present example embodiment are shown in FIG. 16. Tables 15 and 16 represent characteristics of lenses and aspherical values of the optical imaging system according to the present example embodiment.

TABLE 15

| Surface No. | Component | Radius of Curvature | Thickness/ Distance | Refractive Index | Abbe Number | Effective Radius |
|---|---|---|---|---|---|---|
| S1 | First Lens | 3.4813 | 1.0479 | 1.537 | 55.7 | 1.8 |
| S2 | | 657.7948 | 0.2013 | | | 1.7 |
| S3 | Second Lens | 61.6440 | 0.4788 | 1.644 | 23.5 | 1.6 |
| S4 | | 4.7452 | 0.5849 | | | 1.5 |
| S5 | Third Lens | −38.7793 | 0.5967 | 1.537 | 55.7 | 1.5 |
| S6 | | −4.7656 | 0.9649 | | | 1.5 |
| S7 | Fourth Lens | 9.2973 | 0.4562 | 1.570 | 37.4 | 1.4 |
| S8 | | 2.7171 | 0.2000 | | | 1.4 |
| S9 | Fifth Lens | 5.3278 | 1.0000 | 1.667 | 20.4 | 1.4 |
| S10 | | −16.3339 | 0.3091 | | | 1.5 |
| S11 | Sixth Lens | −12.0600 | 0.6000 | 1.644 | 23.5 | 1.5 |
| S12 | | 9.2686 | 2.6865 | | | 1.6 |
| S13 | Filter | Infinity | 0.1100 | 1.517 | 64.2 | 2.5 |
| S14 | | Infinity | 2.6814 | | | 2.5 |
| S15 | Imaging Plane | Infinity | −0.0072 | | | 3.5 |

TABLE 16

| Surface No. | S1 | S2 | S3 | S4 | S5 | S6 |
|---|---|---|---|---|---|---|
| K | −2.30063E−01 | −9.90000E+01 | −4.70227E+00 | 1.74206E+00 | 5.61122E+00 | −1.53505E+00 |
| A | −1.53488E−03 | 1.26206E−03 | 1.04906E−03 | −2.75023E−03 | 9.70000E−05 | 1.30664E−03 |
| B | −4.23348E−04 | −1.32570E−04 | 1.60000E−05 | −1.08893E−03 | 3.43007E−04 | 8.20072E−04 |
| C | −3.70000E−05 | −1.01306E−04 | −2.40000E−05 | −2.95395E−04 | 1.77560E−04 | 3.22515E−04 |
| D | −2.40000E−05 | −2.50000E−05 | −1.30000E−05 | −1.30000E−05 | 2.90000E−05 | 8.60000E−05 |
| E | −3.00000E−06 | −6.00000E−06 | −5.00000E−06 | 7.00000E−06 | 2.00000E−05 | 3.20000E−05 |
| F | −2.94128E−07 | −2.00000E−06 | 1.00000E−06 | 7.00000E−06 | −3.88432E−07 | −1.00000E−05 |
| G | 1.24620E−07 | −2.93944E−09 | −1.00000E−06 | −1.00000E−06 | 2.43234E−07 | −1.00000E−06 |
| H | 1.15915E−08 | −9.37992E−08 | −1.99718E−08 | 2.34996E−07 | −2.53989E−07 | −1.00000E−06 |
| J | −2.55304E−08 | 8.54661E−09 | −7.24343E−08 | −4.32053E−07 | −3.15046E−07 | 3.26334E−07 |
| Surface No. | S7 | S8 | S9 | S10 | S11 | S12 |
| K | −2.98118E+01 | −1.12849E+00 | −8.79790E−01 | 9.90000E+01 | −9.90000E+01 | −2.35526E+01 |
| A | 2.38298E−03 | 9.75548E−04 | 3.40406E−03 | 8.82946E−03 | −1.51995E−02 | −1.07024E−02 |
| B | −8.91131E−04 | 6.72754E−04 | 3.98527E−04 | −6.61481E−04 | −7.17051E−03 | −4.14803E−03 |
| C | −5.80000E−05 | −1.55590E−03 | 9.92217E−04 | −3.78450E−04 | 5.51938E−03 | 2.46269E−03 |
| D | −7.20000E−05 | 2.06187E−04 | −8.49056E−04 | 2.04753E−03 | −9.42289E−04 | 9.48109E−05 |
| E | −1.72093E−04 | −7.53023E−04 | −4.70000E−05 | −4.25934E−04 | −1.10000E−05 | −5.15715E−04 |
| F | 2.44160E−04 | 3.26429E−04 | 1.56092E−04 | 1.06090E−04 | 1.89021E−04 | 1.39423E−04 |
| G | −4.40000E−05 | 1.48261E−04 | −2.65658E−04 | −2.60000E−05 | −1.03732E−04 | 8.78914E−06 |
| H | −1.40000E−05 | 1.15671E−04 | 3.49801E−04 | −1.02779E−04 | −5.50000E−05 | −1.20489E−05 |
| J | 4.00000E−06 | −7.90000E−05 | −1.10548E−04 | 3.20000E−05 | 2.20000E−05 | 2.03136E−06 |

Figure 17:
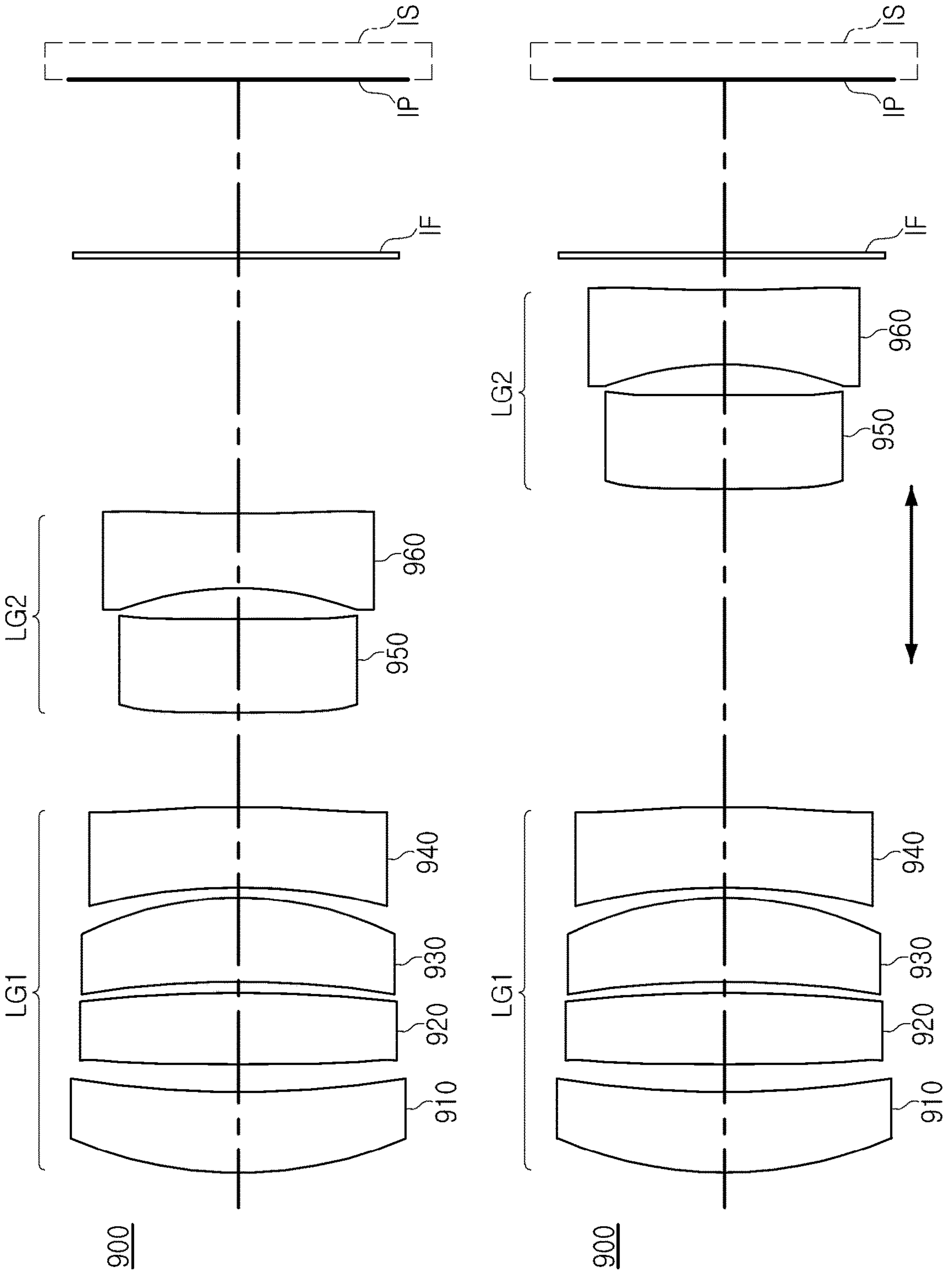
FIG. 17 is a view illustrating an optical imaging system according to a ninth example embodiment in the present disclosure.

An optical imaging system according to a ninth example embodiment will be described with reference to FIG. 17.

The optical imaging system 900 according to the ninth example embodiment may include a first lens group LG1 and a second lens group LG2. The first lens group LG1 may include a first lens 910, a second lens 920, a third lens 930, and a fourth lens 940, and the second lens group LG2 may include a fifth lens 950, and a sixth lens 960. The first lens group LG1 may be configured such that a position thereof with respect to an imaging plane IP is not changed, but the second lens group LG2 may be configured such that a position thereof with respect to the imaging plane IP may be changed. For example, the second lens group LG2 may be moved toward the imaging plane IP side in a state in which it is disposed close to the first lens group LG1, which may enable close-up photography or macrophotography by the optical imaging system 900.

The first lens 910 may have positive refractive power, and an object-side surface thereof may be convex and an image-side surface thereof may be concave. The second lens 920 may have positive refractive power, and an object-side surface thereof may be convex and an image-side surface thereof may be convex. The third lens 930 may have positive refractive power, and an object-side surface thereof may be concave and an image-side surface thereof may be convex. The fourth lens 940 may have negative refractive power, and an object-side surface thereof may be concave and an image-side surface thereof may be convex. The fifth lens 950 may have positive refractive power, and an object-side surface thereof may be convex and an image-side surface thereof may be convex. The sixth lens 960 may have negative refractive power, and an object-side surface thereof may be concave and an image-side surface thereof may be concave. An inflection point may be formed on the image-side surface of the sixth lens 960.

The optical imaging system 900 may further include a filter IF and the imaging plane IP. The filter IF may be disposed between the sixth lens 960 and the imaging plane IP. The imaging plane IP may be formed at a position where light incident by the first lens 910 to the sixth lens 960 forms an image. For example, the imaging plane IP may be formed on one surface of an image sensor IS of a camera module or inside the image sensor IS.

Figure 18:
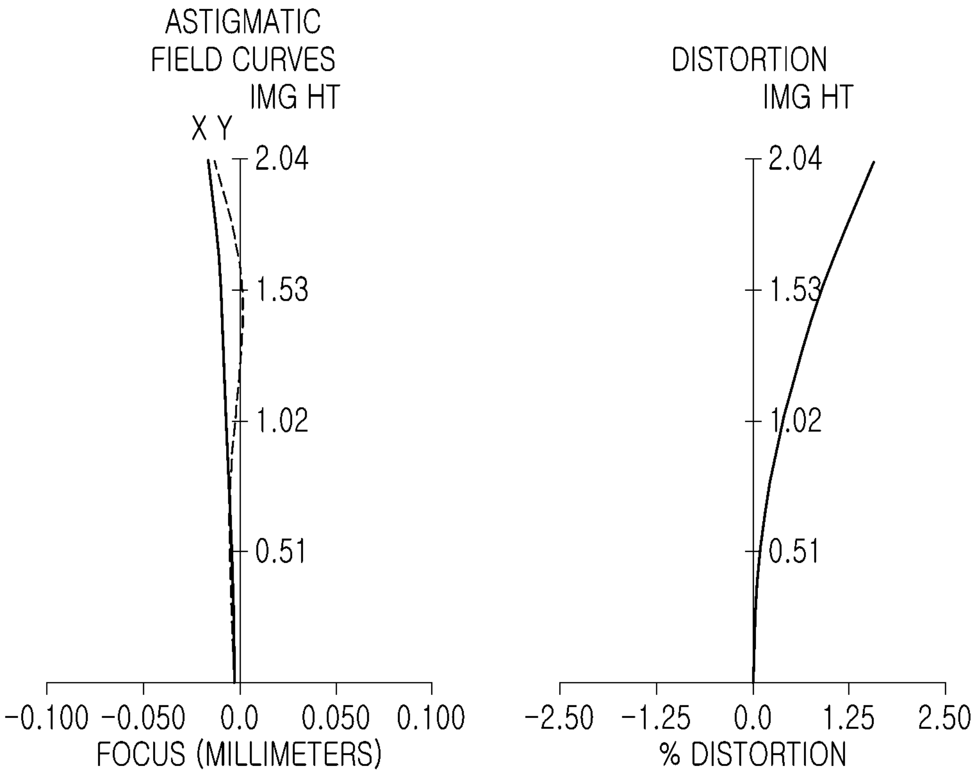
FIG. 18 presents graphs having curves representing aberration characteristics of the optical imaging system illustrated in FIG. 17.

Graphs having curves representing aberration characteristics of the optical imaging system according to the present example embodiment are shown in FIG. 18. Tables 17 and 18 represent characteristics of lenses and aspherical values of the optical imaging system according to the present example embodiment.

TABLE 17

| Surface No. | Component | Radius of Curvature | Thickness/ Distance | Refractive Index | Abbe Number | Effective Radius |
|---|---|---|---|---|---|---|
| S1 | First Lens | 3.9083 | 0.8516 | 1.537 | 55.7 | 1.8 |
| S2 | | 7.5795 | 0.2983 | | | 1.7 |
| S3 | Second Lens | 27.7789 | 0.7576 | 1.537 | 55.7 | 1.7 |
| S4 | | −14.7031 | 0.1098 | | | 1.6 |
| S5 | Third Lens | −16.0297 | 0.8960 | 1.537 | 55.7 | 1.6 |
| S6 | | −3.8036 | 0.1159 | | | 1.6 |
| S7 | Fourth Lens | −4.4729 | 0.8653 | 1.679 | 19.2 | 1.6 |
| S8 | | −9.9675 | 0.9981 | | | 1.5 |
| S9 | Fifth Lens | 21.3421 | 1.0000 | 1.668 | 20.4 | 1.3 |
| S10 | | −31.4741 | 0.3177 | | | 1.2 |
| S11 | Sixth Lens | −3.7703 | 0.8000 | 1.537 | 55.7 | 1.2 |
| S12 | | 11.3670 | 2.7242 | | | 1.5 |
| S13 | Filter | Infinity | 0.1100 | 1.517 | 64.2 | 1.8 |
| S14 | | Infinity | 1.7627 | | | 1.8 |
| S15 | Imaging Plane | Infinity | 0.0024 | | | 2.1 |

TABLE 18

| Surface No. | S1 | S2 | S3 | S4 | S5 | S6 |
|---|---|---|---|---|---|---|
| K | −9.70824E−01 | −9.21106E+00 | 7.63556E+01 | −9.18053E+01 | 4.60005E+01 | −3.31934E−01 |
| A | −1.67056E−03 | −1.08403E−03 | −8.42607E−04 | 4.82879E−04 | −1.96325E−03 | 9.24655E−04 |
| B | −5.03777E−04 | −3.09479E−04 | 2.19049E−04 | 2.54307E−04 | 8.70000E−05 | −6.58513E−04 |

TABLE 18-continued

| | | | | | | |
|---|---|---|---|---|---|---|
| C | −6.70000E−05 | −3.10000E−05 | −1.00000E−05 | −6.00000E−05 | 1.00000E−05 | −8.40000E−05 |
| D | −8.00000E−06 | −6.00000E−06 | −1.10000E−05 | 2.00000E−05 | 1.30000E−05 | −2.10000E−05 |
| E | 1.00000E−06 | 2.00000E−06 | −8.00000E−06 | −6.00000E−06 | −1.20000E−05 | −3.00000E−06 |
| F | 1.17396E−07 | −1.19382E−08 | −1.00000E−06 | 2.00000E−06 | 2.00000E−06 | −1.00000E−06 |
| G | −3.64915E−08 | −1.00000E−06 | −5.40256E−08 | 1.23292E−07 | 1.00000E−06 | −3.05619E−07 |
| H | −9.59419E−09 | 0.00000E+00 | 1.25813E−08 | −3.06966E−07 | −4.70388E−07 | 3.58409E−07 |
| J | 0.00000E+00 | 0.00000E+00 | −5.01297E−08 | −1.96557E−07 | −2.12384E−07 | −4.72563E−08 |
| Surface No. | S7 | S8 | S9 | S10 | S11 | S12 |
| K | −1.23328E+01 | −5.12552E+01 | −7.65416E+01 | 5.48169E+01 | 2.78294E+00 | −1.11181E+01 |
| A | 1.73787E−03 | 7.91688E−03 | 1.77963E−02 | 2.61246E−02 | 1.04118E−03 | −1.45760E−02 |
| B | 8.24012E−04 | −4.90000E−05 | 2.62625E−03 | 3.47870E−03 | 1.90000E−05 | 2.78989E−03 |
| C | 7.00000E−06 | 2.04211E−04 | −1.37278E−03 | −1.77033E−03 | −7.17999E−04 | −2.45112E−03 |
| D | −3.30000E−05 | 8.80000E−05 | −1.20000E−05 | −1.99014E−04 | −2.60295E−03 | 3.60863E−04 |
| E | −1.40000E−05 | 4.00000E−06 | 3.00296E−04 | −6.70604E−04 | −4.25999E−04 | 2.94748E−04 |
| F | −2.00000E−06 | −3.50000E−05 | 1.22273E−04 | 1.36810E−04 | 1.10188E−03 | 6.78998E−05 |
| G | 2.00000E−06 | 9.00000E−06 | −5.20000E−05 | 5.30051E−04 | 7.19905E−04 | −5.55157E−05 |
| H | 0.00000E+00 | 0.00000E+00 | −4.20000E−05 | 4.61825E−04 | −7.90000E−05 | −2.84914E−05 |
| J | 0.00000E+00 | 0.00000E+00 | 1.40000E−05 | −3.24835E−04 | −1.92379E−04 | 1.08204E−05 |

Figure 19:
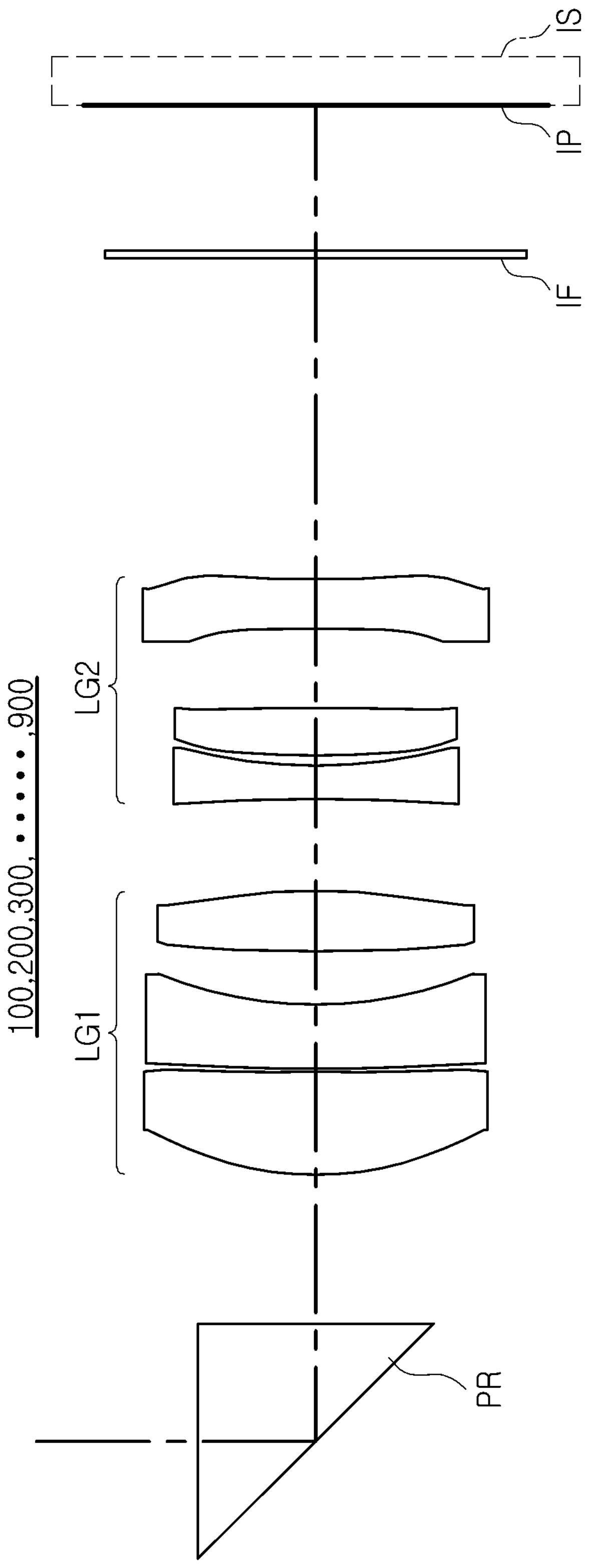
FIG. 19 is a view illustrating another form of the optical imaging system according to the first to ninth example embodiments.

The optical imaging systems 100, 200, 300, 400, 500, 600, 700, 800, and 900 according to the first to ninth example embodiments described above may be configured to be easily mounted in a thin electronic device. For example, the optical imaging system 100, 200, 300, 400, 500, 600, 700, 800, and 900 may include one or more optical path converting units PR for converting an optical path so as to be disposed in a length direction of the thin electronic device. The optical path converting unit PR may be disposed on an object side of the first lens group LG1 as illustrated in FIG. 19. However, a position of the optical path converting unit PR is not limited to the object side of the first lens group LG1. For example, the optical path converting unit PR may also be disposed between the first lens group LG1 and the second lens group LG2 or be disposed behind the second lens group LG2.

Tables 19 and 20 represent optical characteristic values and values of Conditional Expressions of the optical imaging systems according to the first to ninth example embodiments.

TABLE 19

| Remark | First Example Embodiment | Second Example Embodiment | Third Example Embodiment | Fourth Example Embodiment | Fifth Example Embodiment |
|---|---|---|---|---|---|
| f | 9.0907 | 11.3292 | 15.0107 | 8.1182 | 14.5805 |
| f2 | −11.5240 | −361.8972 | −73.8464 | −9.4560 | 202.9738 |
| f3 | 13.0152 | 5.2460 | 5.9067 | 9.6097 | 7.4898 |
| f4 | −8.8864 | −9.1956 | −12.0896 | 10.9930 | −4.8594 |
| f5 | 12.8803 | 23.5835 | 39.2748 | −8.5547 | 23.9696 |
| f6 | −18.9068 | −5.5590 | −5.7498 | −11.4431 | 449.0063 |
| TTL | 16.2959 | 13.3301 | 15.5049 | 12.7852 | 13.3078 |
| BFL | 7.2302 | 3.8923 | 5.5781 | 3.6657 | 2.8562 |
| f | 17.7598 | 11.8000 | 17.0000 | 12.4000 | 12.4000 |
| ImgH | 3.4700 | 2.1400 | 3.1400 | 2.4000 | 2.0400 |
| fM | 14.3554 | 7.8807 | 8.8953 | 10.1309 | 12.0386 |
| dm | 1.4970 | 2.0194 | 1.9530 | 1.4660 | 0.9030 |
| fG1 | 10.1560 | 7.0326 | 8.6970 | 8.5720 | 18.3050 |
| fG2 | −11.0611 | −6.8286 | −6.4370 | −9.4680 | 20.3610 |

| Remark | Sixth Example Embodiment | Seventh Example Embodiment | Eighth Example Embodiment | Ninth Example Embodiment |
|---|---|---|---|---|
| f | 8.0639 | 12.3404 | 6.5185 | 13.8955 |
| f2 | −9.2969 | −884.3671 | −8.0088 | 18.0113 |
| f3 | 9.5481 | 5.4634 | 10.0637 | 9.0525 |
| f4 | −7.1944 | −12.9085 | −6.9105 | −12.7647 |
| f5 | 6.8167 | 19.8138 | 6.1408 | 19.1752 |
| f6 | −8.3106 | −5.4155 | −8.0488 | −5.1753 |
| TTL | 13.9562 | 12.3938 | 11.9103 | 11.6096 |
| BFL | 6.1489 | 4.1777 | 5.4706 | 4.5994 |
| f | 15.0000 | 11.8000 | 12.4000 | 11.8000 |
| ImgH | 2.2690 | 2.0400 | 3.2690 | 2.0400 |
| fM | 12.5314 | 8.2003 | 10.6694 | 7.8849 |
| dm | 1.0250 | 1.7990 | 1.0060 | 2.3120 |
| fG1 | 8.4950 | 6.9543 | 7.8440 | 7.3050 |
| fG2 | −9.1840 | −6.9544 | −9.8050 | −7.5210 |

TABLE 20

| Conditional Expression | First Example Embodiment | Second Example Embodiment | Third Example Embodiment | Fourth Example Embodiment | Fifth Example Embodiment |
|---|---|---|---|---|---|
| TTL/f | 0.9176 | 1.1297 | 0.9121 | 1.0311 | 1.0732 |
| \|fG1/fG2\| | 0.9182 | 1.0299 | 1.3511 | 0.9054 | 0.8990 |
| f3/f | 0.7328 | 0.4446 | 0.3475 | 0.7750 | 0.6040 |
| TTL/ImgH | 4.6962 | 6.2290 | 4.9379 | 5.3272 | 6.5234 |
| R1/R4 | 0.7378 | −0.6782 | 0.6590 | 0.7535 | 0.6707 |
| BFL/f | 0.4071 | 0.3299 | 0.3281 | 0.2956 | 0.2303 |
| BFL/TTL | 0.4437 | 0.2920 | 0.3598 | 0.2867 | 0.2146 |
| Dm | 1.4970 | 2.0194 | 1.9530 | 1.4660 | 0.9030 |
| \|fG1/fG2\| | 0.9182 | 1.0299 | 1.3511 | 0.9054 | 0.8990 |
| Dm/TTL | 0.0919 | 0.1515 | 0.1260 | 0.1147 | 0.0679 |
| Dm/BFL | 0.2070 | 0.5188 | 0.3501 | 0.3999 | 0.3162 |
| Dm/f | 0.0843 | 0.1711 | 0.1149 | 0.1182 | 0.0728 |
| fM/f | 0.8083 | 0.6679 | 0.5233 | 0.8170 | 0.9709 |
| f1/f | 0.5119 | 0.9601 | 0.8830 | 0.6547 | 1.1758 |
| f2/f | −0.6489 | −30.6693 | −4.3439 | −0.7626 | 16.3689 |
| f3/f | 0.7328 | 0.4446 | 0.3475 | 0.7750 | 0.6040 |
| f4/f | −0.5004 | −0.7793 | −0.7112 | 0.8865 | −0.3919 |
| f5/f | 0.7253 | 1.9986 | 2.3103 | −0.6899 | 1.9330 |
| f6/f | −1.0646 | −0.4711 | −0.3382 | −0.9228 | 36.2102 |
| (R1 + R2)/(R1 − R2) | −1.1252 | −1.9705 | −2.8251 | −0.8688 | −3.9209 |
| (R1 + R4)/(R1 − R4) | −6.6289 | −0.1918 | −4.8659 | −7.1127 | −5.0736 |
| R1/R4 | 0.7378 | −0.6782 | 0.6590 | 0.7535 | 0.6707 |

| Conditional Expression | Sixth Example Embodiment | Seventh Example Embodiment | Eighth Example Embodiment | Ninth Example Embodiment |
|---|---|---|---|---|
| TTL/f | 0.9304 | 1.0503 | 0.9605 | 0.9839 |
| \|fG1/fG2\| | 0.9250 | 1.0000 | 0.8000 | 0.9713 |
| f3/f | 0.6365 | 0.4630 | 0.8116 | 0.7672 |
| TTL/ImgH | 4.2693 | 6.0754 | 3.6434 | 5.6910 |
| R1/R4 | −0.0188 | 0.4071 | 0.7336 | −0.2658 |
| BFL/f | 0.4099 | 0.3540 | 0.4412 | 0.3898 |
| BFL/TTL | 0.4406 | 0.3371 | 0.4593 | 0.3962 |
| Dm | 1.0250 | 1.7990 | 1.0060 | 2.3120 |
| \|fG1/fG2\| | 0.9250 | 1.0000 | 0.8000 | 0.9713 |
| Dm/TTL | 0.0734 | 0.1452 | 0.0845 | 0.1991 |
| Dm/BFL | 0.1667 | 0.4306 | 0.1839 | 0.5027 |
| Dm/f | 0.0683 | 0.1525 | 0.0811 | 0.1959 |
| fM/f | 0.8354 | 0.6949 | 0.8604 | 0.6682 |
| f1/f | 0.5376 | 1.0458 | 0.5257 | 1.1776 |
| f2/f | −0.6198 | −74.9464 | −0.6459 | 1.5264 |
| f3/f | 0.6365 | 0.4630 | 0.8116 | 0.7672 |
| f4/f | −0.4796 | −1.0939 | −0.5573 | −1.0818 |
| f5/f | 0.4544 | 1.6791 | 0.4952 | 1.6250 |
| f6/f | −0.5540 | −0.4589 | −0.6491 | −0.4386 |
| (R1 + R2)/(R1 − R2) | −1.0984 | −2.1504 | −1.0106 | −3.1291 |
| (R1 + R4)/(R1 − R4) | −0.9631 | −2.3731 | −6.5088 | −0.5800 |
| R1/R4 | −0.0188 | 0.4071 | 0.7336 | −0.2658 |

As set forth above, the optical imaging system according to an example embodiment in the present disclosure may capture images of a subject positioned at a long distance or a middle distance and a subject located at an ultra-close distance.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:

a first lens group including two or more lenses; and a second lens group including two or more lenses, wherein the first lens group and the second lens group are sequentially arranged from an object side, wherein the first and second lens groups comprise a first lens, a second lens, a third lens, a fourth lens, a fifth lens, and a sixth lens, sequentially arranged from the object side, wherein the fourth lens has a concave object-side surface, wherein the fifth lens has positive refractive power, wherein the second lens group is configured to be movable in an optical axis direction, and wherein $0.8<TTL/f<1.2$ and $0.32<f3/f<0.82$, in which TTL is a distance from an object-side surface of the foremost lens of the first lens group to an imaging plane, f is a focal length of the optical imaging system, and f3 is a focal length of the third lens.

2. The optical imaging system of claim 1, wherein $0.7<|fG1/fG2|<1.4$, where fG1 is a focal length of the first lens group, and fG2 is a focal length of the second lens group.

3. The optical imaging system of claim 1, wherein the first lens group includes a first lens, a second lens, and a third lens, sequentially arranged from the object side.

4. The optical imaging system of claim 1, wherein the first lens has positive refractive power, wherein the second lens has negative refractive power, and wherein the third lens has positive refractive power.

5. The optical imaging system of claim 1, wherein an image-side surface of the third lens is convex.

6. The optical imaging system of claim 1, wherein the second lens group includes a fourth lens, a fifth lens, and a sixth lens, sequentially arranged from the object side.

7. The optical imaging system of claim 1, wherein the fourth lens has negative refractive power and the sixth lens has negative refractive power.

8. The optical imaging system of claim 1, wherein $4.0<TTL/ImgH<7.0$ in which ImgH is a height of the imaging plane.

9. An optical imaging system comprising:

a first lens, a second lens, a third lens, a fourth lens, a fifth lens, and a sixth lens that are sequentially arranged from an object side, wherein an image-side surface of the third lens is convex, wherein the fourth lens has a concave object-side surface, wherein the fifth lens has positive refractive power, and wherein $0.8<TTL/f<1.2$, $0.32<f3/f<0.82$, and $-1.0<R1/R4<1.0$, where TTL is a distance from an object-side surface of the first lens to an imaging plane, f is a focal length of the optical imaging system, f3 is a focal length of the third lens, R1 is a radius of curvature of the object-side surface of the first lens, and R4 is a radius of curvature of an image-side surface of the second lens.

10. The optical imaging system of claim 9, wherein the image-side surface of the second lens is concave.

11. The optical imaging system of claim 9, wherein an image-side surface of the fifth lens is convex.

12. The optical imaging system of claim 9, wherein an object-side surface of the sixth lens is concave.

13. The optical imaging system of claim 9, wherein $0.23<BFL/f<0.46$, where BFL is a distance from an image-side surface of the sixth lens to the imaging plane.

14. An optical imaging system comprising:

a first lens, a second lens, a third lens, a fourth lens, a fifth lens, and a sixth lens that are sequentially arranged from an object side and divided into a first lens group and a second lens group of two or more lenses each, wherein the fourth lens has a concave object-side surface, wherein the fifth lens has positive refractive power, wherein the second lens group is disposed toward the image side of the first lens group and configured to be movable in an optical axis direction, wherein the optical imaging system includes no more than six lenses, and wherein $0.32<f3/f<0.82$, where f is a focal length of the optical imaging system and f3 is a focal length of the third lens.

15. The optical imaging system of claim 14, wherein the first lens group comprises the first through the third lenses, and the second lens group comprises the fourth through the sixth lenses.

16. The optical imaging system of claim 14, wherein $0.8<TTL/f<1.2$ in which TTL is a distance from an object-side surface of the first lens to an imaging plane.

17. The optical imaging system of claim 14, wherein the first lens group comprises the first through the fourth lenses, and the second lens group comprises the fifth and sixth lenses.

18. The optical imaging system of claim 14, wherein $0.8<TTL/f<1.2$, and $-1.0<R1/R4<1.0$, where TTL is a distance from an object-side surface of the first lens to an imaging plane, R1 is a radius of curvature of the object-side surface of the first lens, and R4 is a radius of curvature of an image-side surface of the second lens.

* * * * *